US011761523B2

(12) United States Patent
Tomita et al.

(10) Patent No.: US 11,761,523 B2
(45) Date of Patent: Sep. 19, 2023

(54) ROTARY DEVICE AND POWER TRANSMISSION DEVICE

(71) Applicant: EXEDY Corporation, Neyagawa (JP)

(72) Inventors: Yusuke Tomita, Neyagawa (JP); Yusuke Okamachi, Neyagawa (JP)

(73) Assignee: EXEDY Corporation, Neyagawa (JP)

(*) Notice: Subject to any disclaimer, the term of this patent is extended or adjusted under 35 U.S.C. 154(b) by 0 days.

(21) Appl. No.: 17/574,887

(22) Filed: Jan. 13, 2022

(65) Prior Publication Data

US 2022/0260141 A1 Aug. 18, 2022

(30) Foreign Application Priority Data

Feb. 15, 2021 (JP) ................. 2021-021567
Sep. 14, 2021 (JP) ................. 2021-149640

(51) Int. Cl.
F16H 45/02 (2006.01)
F16H 53/06 (2006.01)
F16H 41/24 (2006.01)
F16F 15/14 (2006.01)

(52) U.S. Cl.
CPC .......... F16H 45/02 (2013.01); F16F 15/145 (2013.01); F16H 41/24 (2013.01); F16H 53/06 (2013.01); F16H 2045/0221 (2013.01)

(58) Field of Classification Search
CPC .......... F16H 45/02; F16H 41/24; F16H 53/06; F16H 2045/0221; F16F 15/145
See application file for complete search history.

(56) References Cited

U.S. PATENT DOCUMENTS 10,619,702 B2 * 4/2020 Tomiyama ............. F16H 41/24
2019/0085936 A1 * 3/2019 Kawahara ............. F16F 15/145
2021/0079990 A1 * 3/2021 Higuchi ................. F16H 45/02

FOREIGN PATENT DOCUMENTS

DE 102019215923 A1 * 4/2021
JP 2018-132161 A 8/2018

* cited by examiner

Primary Examiner — Huan Le
Assistant Examiner — Aimee Tran Nguyen
(74) Attorney, Agent, or Firm — United IP Counselors, LLC

(57) ABSTRACT

A rotary device is disclosed. The rotary device includes a first rotor, a centrifugal element, and a tilt preventing mechanism. The first rotor is disposed to be rotatable. The centrifugal element is supported to be axially movable with respect to the first rotor. The tilt preventing mechanism prevents the centrifugal element from tilting.

18 Claims, 24 Drawing Sheets

ROTARY DEVICE AND POWER TRANSMISSION DEVICE

CROSS-REFERENCE TO RELATED APPLICATIONS

This application claims priority to Japanese Patent Application No. 2021-021567 filed Feb. 15, 2021, and Japanese Patent Application No. 2021-149640 filed Sep. 14, 2021. The entire contents of those applications are incorporated by reference herein in their entireties.

TECHNICAL FIELD

The present invention relates to a rotary device and a power transmission device.

BACKGROUND ART

There has been known a type of rotary device in which one or more centrifugal elements are attached to a first rotor that is rotatable. This type of rotary device exerts a function by smooth radial movement of the one or more centrifugal elements. This type of rotary device is exemplified by a torque fluctuation inhibiting device.

For example, in a torque fluctuation inhibiting device described in Japan Laid-open Patent Application Publication No. 2018-132161, a flange plate and a mass body are provided to be rotatable relative to each other. Centrifugal elements are attached to the flange plate. When the centrifugal elements are radially moved by centrifugal forces acting thereon, difference in rotational phase between the flange plate and the mass body is reduced. As a result, torque fluctuations are inhibited.

The torque fluctuation inhibiting device described above has been demanded to smoothly move the centrifugal elements in order to prevent functional degradation thereof.

In view of the above, it is an object of the present invention to provide a rotary device in which one or more centrifugal elements are radially movable in smooth manner.

BRIEF SUMMARY

A rotary device according to a first aspect of the present invention includes a first rotor, a centrifugal element, and a tilt preventing mechanism. The first rotor is disposed to be rotatable. The centrifugal element is supported to be radially movable with respect to the first rotor. The tilt preventing mechanism prevents the centrifugal element from tilting.

According to this configuration, the centrifugal element can be prevented from tilting by the tilt preventing mechanism. Because of this, the centrifugal element can be prevented from tilting and interfering a member adjacent thereto. As a result, the centrifugal element can be radially moved in smooth manner.

Preferably, the rotary device further includes a support member. The support member supports the centrifugal element from radially outside when the centrifugal element is moved radially outward. The tilt preventing mechanism is configured to restrict the centrifugal element from axially moving with respect to the support member. According to this configuration, the centrifugal element can be stably supported by the support member. Hence, it is possible to prevent occurrence of an undesirable situation that the centrifugal element is unstably supported, and thereby, tilting of the centrifugal element is caused.

Preferably, the tilt preventing mechanism includes a groove and a protrusion. The groove is provided on either of the support member and the centrifugal element. The protrusion is provided on the other of the support member and the centrifugal element. The protrusion is disposed within the groove.

Preferably, the tilt preventing mechanism includes a contact surface and a guide surface. The contact surface faces radially outward. The guide surface faces radially inward and is opposed to the contact surface. The contact surface is provided on the centrifugal element. The guide surface dents to gradually increase in depth axially toward a middle part thereof. According to this configuration, the centrifugal element can be kept in stable posture by the guide surface. Because of this, the centrifugal element can be prevented from tilting.

Preferably, the contact surface protrudes to gradually increase in height axially toward a middle part thereof.

Preferably, the tilt preventing mechanism includes a contact surface and a guide surface. The contact surface faces radially inward. The guide surface faces radially outward and is opposed to the contact surface. The guide surface is provided on the centrifugal element. The guide surface dents to gradually increase in depth axially toward a middle part thereof. According to this configuration, the centrifugal element can be kept in stable posture by the guide surface. Because of this, the centrifugal element can be prevented from tilting.

Preferably, the contact surface protrudes to gradually increase in height axially toward a middle part thereof.

Preferably, the centrifugal element includes a first contact surface and a second contact surface. The first and second contact surfaces are disposed axially apart from each other at an interval. The first and second contact surfaces make contact with the first rotor. The tilt preventing mechanism is formed by the first and second contact surfaces. According to this configuration, the centrifugal element makes contact with the first rotor at two sites of the first and second contact surfaces. Hence, the centrifugal element is stabled in posture and can be thereby prevented from tilting.

Preferably, the rotary device further includes a second rotor. The second rotor is disposed to be rotatable with the first rotor and be rotatable relative to the first rotor.

Preferably, the rotary device further includes a second rotor. The second rotor is disposed to be rotatable with the first rotor and be rotatable relative to the first rotor. The tilt preventing mechanism includes a slide member disposed between the centrifugal element and the second rotor.

Preferably, the slide member is made in shape of an annulus circumferentially extending.

Preferably, the slide member curves to reduce in thickness toward both outer and inner peripheral edges thereof.

Preferably, the rotary device further includes a second rotor. The second rotor is disposed to be rotatable with the first rotor and be rotatable relative to the first rotor. The tilt preventing mechanism includes an elastic member disposed between the centrifugal element and the second rotor.

Preferably, the second rotor includes a first plate and a second plate. The first and second plates are disposed axially apart from each other at an interval. The centrifugal element is disposed between the first and second plates. The elastic member includes a first elastic member and a second elastic member. The first elastic member is disposed between the first plate and the centrifugal element. The second elastic member is disposed between the second plate and the centrifugal element.

Preferably, the rotary device further includes a cam mechanism. The cam mechanism receives a centrifugal force acting on the centrifugal element and converts the centrifugal force into a circumferential force directed to reduce rotational phase difference between the first rotor and the second rotor.

Preferably, the cam mechanism includes a cam surface and a cam follower. The cam surface is provided on the centrifugal element. The cam follower makes contact with the cam surface. The cam follower transmits a force therethrough between the centrifugal element and the second rotor.

Preferably, the cam follower rolls on the cam surface.

Preferably, the centrifugal element includes a first through hole axially penetrating therethrough. The cam surface is provided as part of an inner wall surface of the first through hole.

Preferably, the cam follower is attached to the second rotor while being rotatable about a rotational axis thereof.

Preferably, the second rotor includes a second through hole. The cam follower rolls on an inner wall surface of the second through hole.

Preferably, the cam follower includes a small diameter portion and a large diameter portion. The small diameter portion makes contact with the inner wall surface of the second through hole. The large diameter portion makes contact with the centrifugal element. The large diameter portion has an outer diameter gradually increasing toward a thickness directional middle thereof. According to this configuration, a contact state between the cam follower and the centrifugal element is not greatly changed even in tilting of the cam follower.

Preferably, the centrifugal element is configured to rotate about a rotational axis thereof in radial movement thereof.

Preferably, the rotary device further includes a first rolling member. The first rotor includes a first guide surface and a second guide surface. The first and second guide surfaces circumferentially face each other. The first rolling member is disposed between the first guide surface and the centrifugal element. The first rolling member is configured to roll on the first guide surface in accordance with rotation of the centrifugal element about the rotational axis thereof.

Preferably, the centrifugal element is configured to roll on the second guide surface.

A power transmission device according to a second aspect of the present invention includes an input member, an output member, and the rotary device configured as any of the above. The output member is a member to which a torque is transmitted from the input member.

Overall, according to the present invention, a centrifugal element can be radially moved in smooth manner.

DETAILED DESCRIPTION

A torque fluctuation inhibiting device (exemplary rotary device) and a torque converter (exemplary power transmission device) according to respective preferred embodiments will be hereinafter explained with reference to drawings. It should be noted that in the following explanation, the term "axial direction" refers to an extending direction of a rotational axis O of the torque fluctuation inhibiting device. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on a centrifugal element in FIG. 4. Likewise, the radial direction is not required to be perfectly matched with a diameter direction of the imaginary circle about the rotational axis O, and is conceptualized as encompassing, for instance, an up-and-down direction defined based on the centrifugal element in FIG. 4.

First Embodiment

A torque fluctuation inhibiting device according to a first embodiment will be hereinafter explained. First, a torque converter, to which the torque fluctuation inhibiting device according to the first embodiment is attached, will be explained.

[Entire Configuration]

Figure 1:
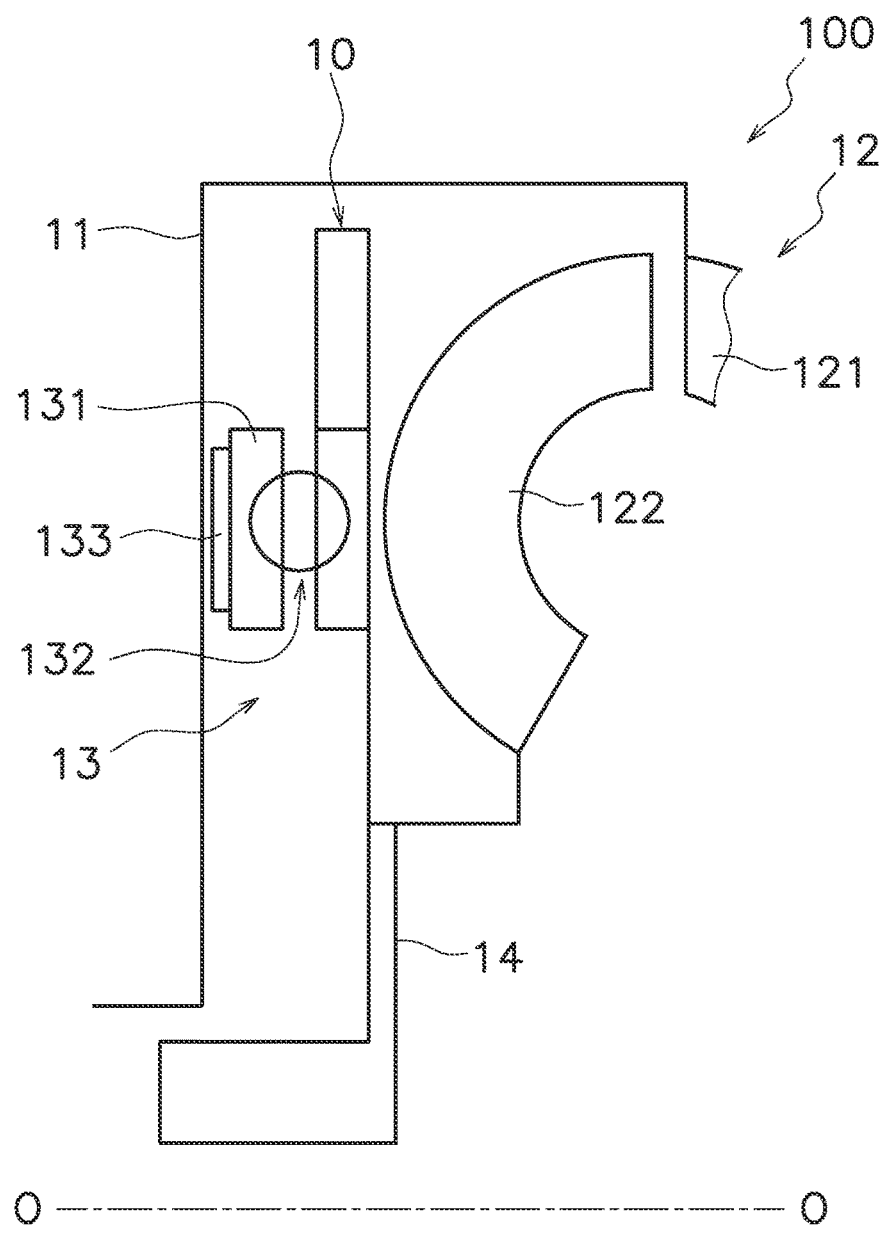
FIG. 1 is a schematic diagram of a torque converter.

FIG. 1 is a schematic diagram of a torque converter 100. As shown in FIG. 1, the torque converter 100 includes a front cover 11, a torque converter body 12, a lock-up device 13, and an output hub 14 (exemplary output member). The front cover 11 is a member to which a torque is inputted from an engine. The torque converter body 12 includes an impeller 121 coupled to the front cover 11, a turbine 122, and a stator (not shown in the drawings). The turbine 122 is coupled to the output hub 14. An input shaft of a transmission (not shown in the drawings) is spline-coupled to the output hub 14.

[Lock-Up Device 13]

The lock-up device 13 includes components such as a clutch part and a piston to be actuated by hydraulic pressure or so forth and can be set to a lock-up on state and a lock-up off state. In the lock-up on state, the torque inputted to the front cover 11 is transmitted to the output hub 14 through the lock-up device 13 without through the torque converter body 12. On the other hand, in the lock-up off state, the torque inputted to the front cover 11 is transmitted to the output hub 14 through the torque converter body 12.

The lock-up device 13 includes an input-side rotor 131 (exemplary input member), a damper 132, and a torque fluctuation inhibiting device 10.

The input-side rotor 131 includes a piston movable in the axial direction and a friction member 133 fixed to the front cover 11—side lateral surface thereof. When the friction member 133 is pressed against the front cover 11, the torque is transmitted from the front cover 11 to the input-side rotor 131.

The damper 132 is disposed between the input-side rotor 131 and a flange plate 2 (to be described). The damper 132 includes a plurality of torsion springs and elastically couples the input-side rotor 131 and the flange plate 2 in the circumferential direction. The damper 132 transmits the torque from the input-side rotor 131 to the flange plate 2 therethrough, and besides, absorbs and attenuates torque fluctuations.

[Torque Fluctuation Inhibiting Device 10]

Figure 2:
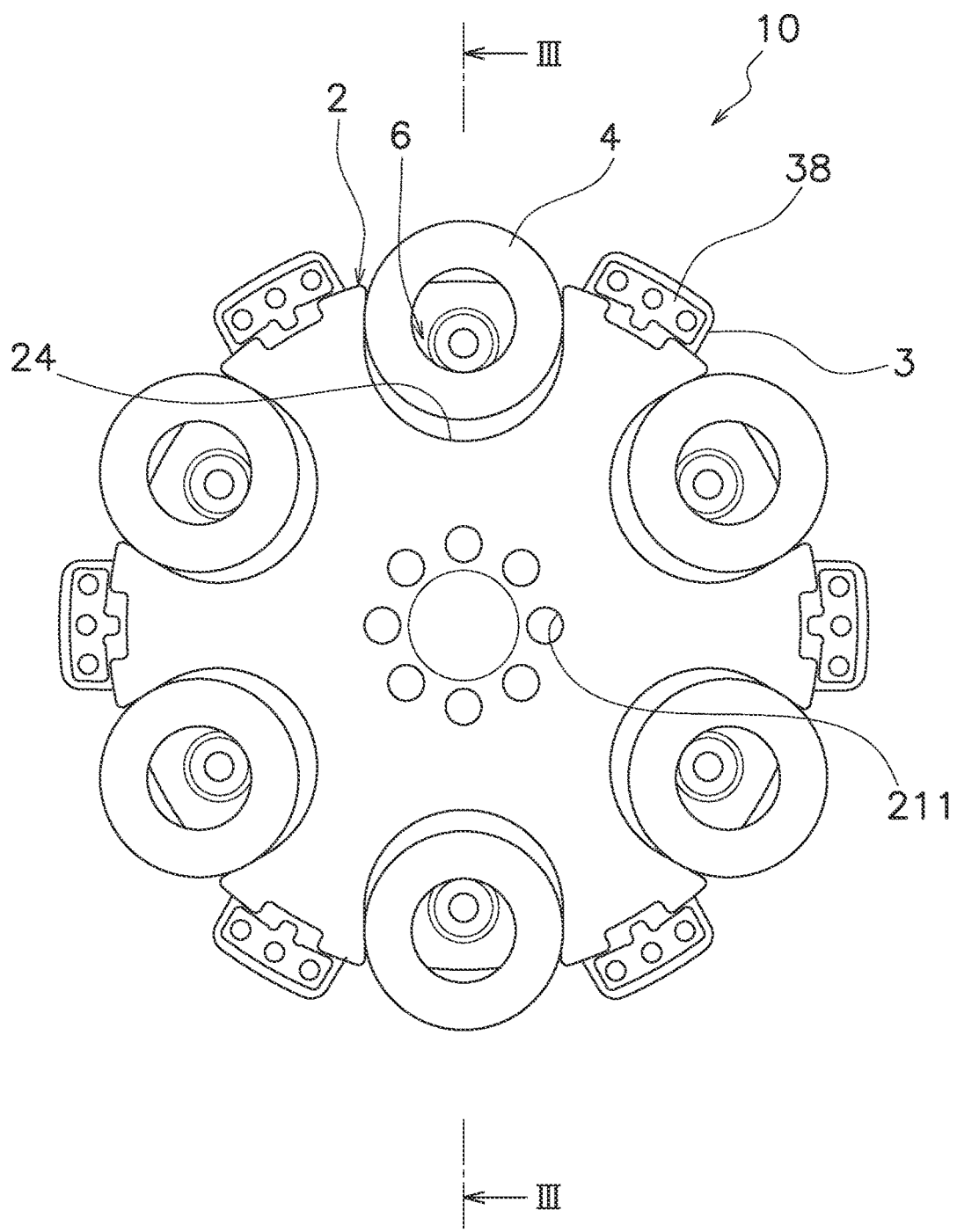
FIG. 2 is a front view of a torque fluctuation inhibiting device according to a first embodiment, from which a first plate is detached.
Figure 3:
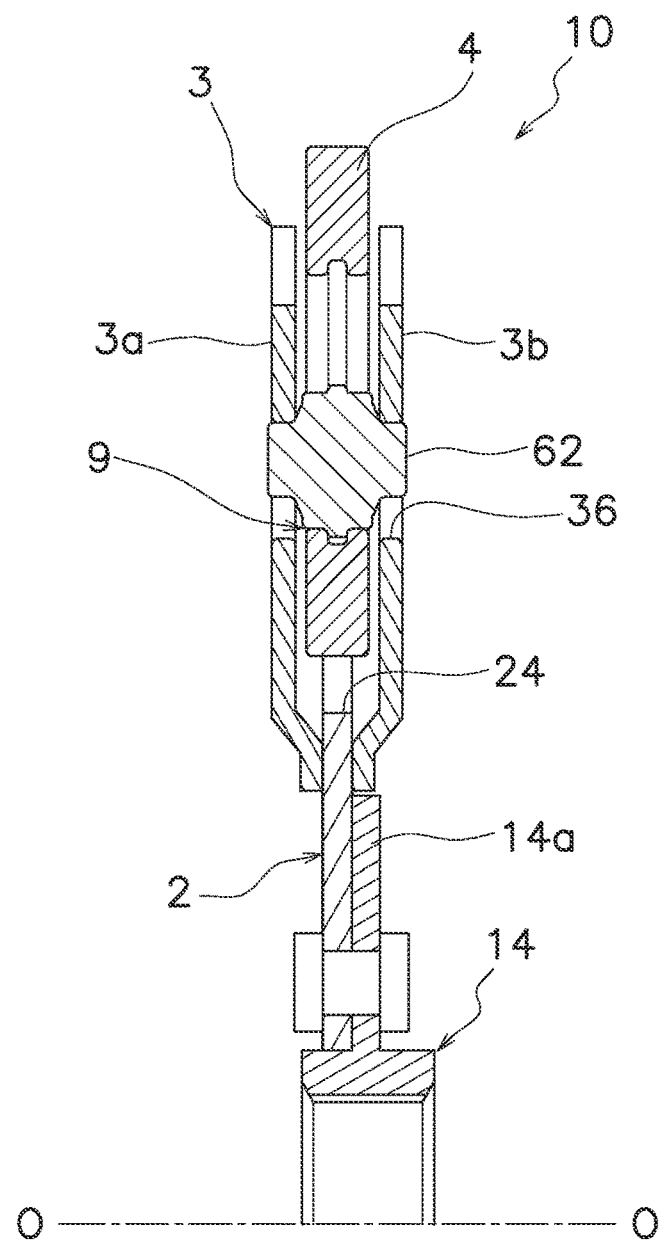
FIG. 3 is a cross-sectional view taken along line III in FIG. 2.

FIG. 2 is a front view of the torque fluctuation inhibiting device 10, whereas FIG. 3 is a cross-sectional view taken along line in FIG. 2. It should be noted that a first plate 3a is detached in FIG. 2. On the other hand, the output hub 14 is attached in FIG. 3. Besides, unless specifically stated otherwise, the respective drawings show a condition that the torque fluctuation inhibiting device 10 is being rotated and centrifugal elements 4 have been moved radially outward.

As shown in FIGS. 2 and 3, the torque fluctuation inhibiting device 10 includes the flange plate 2 (exemplary first rotor), an inertia ring 3 (exemplary second rotor), the centrifugal elements 4, cam mechanisms 6, and tilt preventing mechanisms 9.

<Flange Plate 2>

The flange plate 2 is disposed to be rotatable. The flange plate 2 is axially opposed to the input-side rotor 131. The flange plate 2 is rotatable relative to the input-side rotor 131. The flange plate 2 is coupled to the output hub 14. In other words, the flange plate 2 is unitarily rotated with the output hub 14. It should be noted that the flange plate 2 can be integrated with the output hub 14 as a single member.

The flange plate 2 is an annular plate. The flange plate 2 can be made greater in thickness than each of the first plate 3a and a second plate 3b (both to be described). The flange plate 2 includes a plurality of attachment holes 211 in the inner peripheral end thereof. The flange plate 2 is attached to the output hub 14 by utilizing the attachment holes 211.

The flange plate 2 includes a plurality of accommodation portions 24. In the present embodiment, the flange plate 2 includes six accommodation portions 24. The plural accommodation portions 24 are disposed apart from each other at intervals in the circumferential direction. Each accommodation portion 24 is opened radially outward. Each accommodation portion 24 has a predetermined depth.

Figure 4:
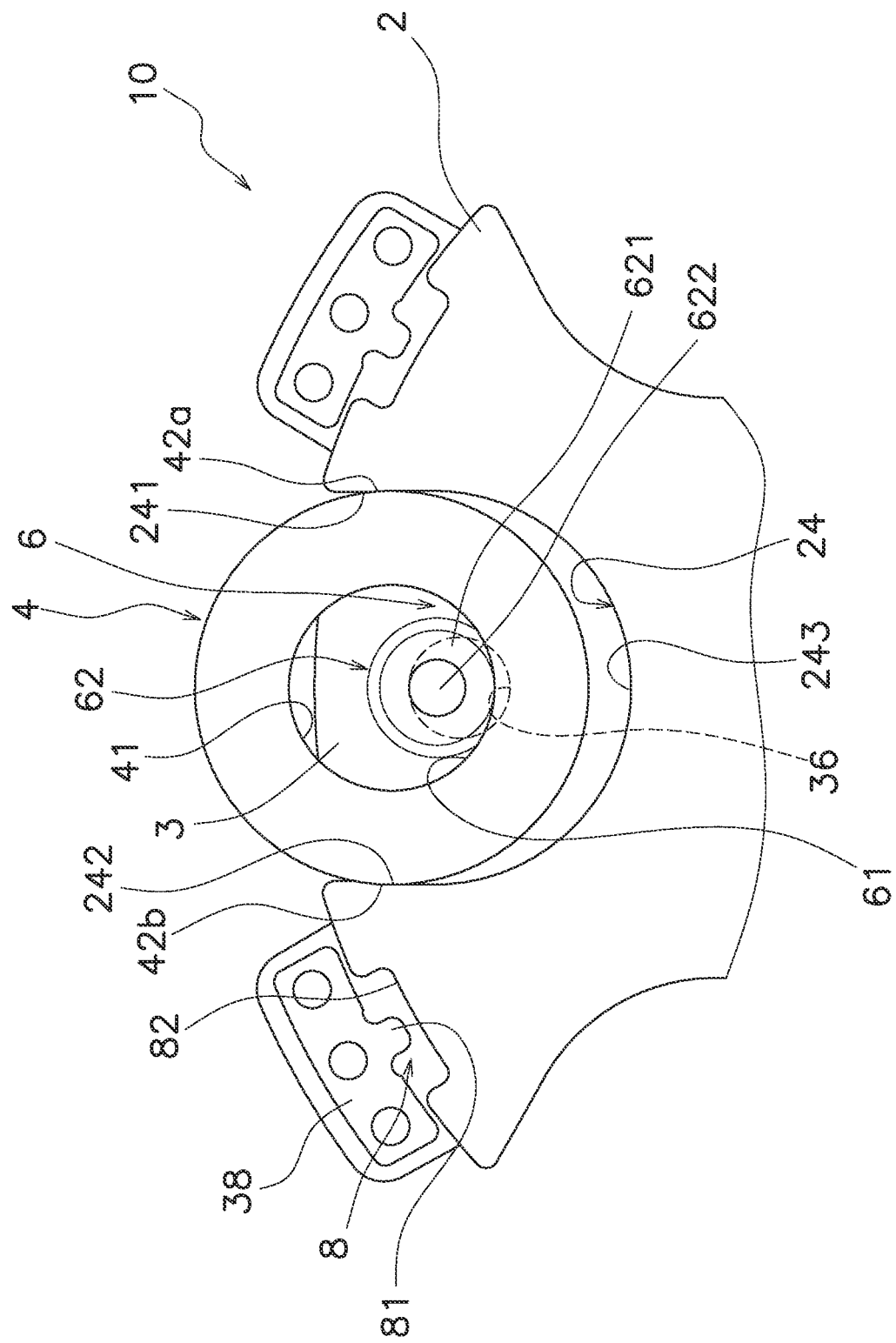
FIG. 4 is an enlarged front view of the torque fluctuation inhibiting device according to the first embodiment.

FIG. 4 is an enlarged view of the torque fluctuation inhibiting device 10. As shown in FIG. 4, each accommodation portion 24 includes a first guide surface 241, a second guide surface 242, and a bottom surface 243. The first guide surface 241, the second guide surface 242, and the bottom surface 243 compose the inner wall surface of each accommodation portion 24.

The first and second guide surfaces 241 and 242 face both sides in the circumferential direction (right-and-left direction in FIG. 4). The first and second guide surfaces 241 and 242 face each centrifugal element 4. Without installation of each centrifugal element 4, the first and second guide surfaces 241 and 242 are opposed to each other. The first and second guide surfaces 241 and 242 extend approximately in parallel to each other. The first and second guide surfaces 241 and 242 are each made in shape of a flat surface.

The bottom surface 243 connects the first guide surface 241 and the second guide surface 242 therethrough. The bottom surface 243 has an approximately circular-arc shape in a front view (axial view). The bottom surface 243 faces radially outward. The bottom surface 243 is opposed to the outer peripheral surface of each centrifugal element 4.

<Inertia Ring 3>

Figure 5:
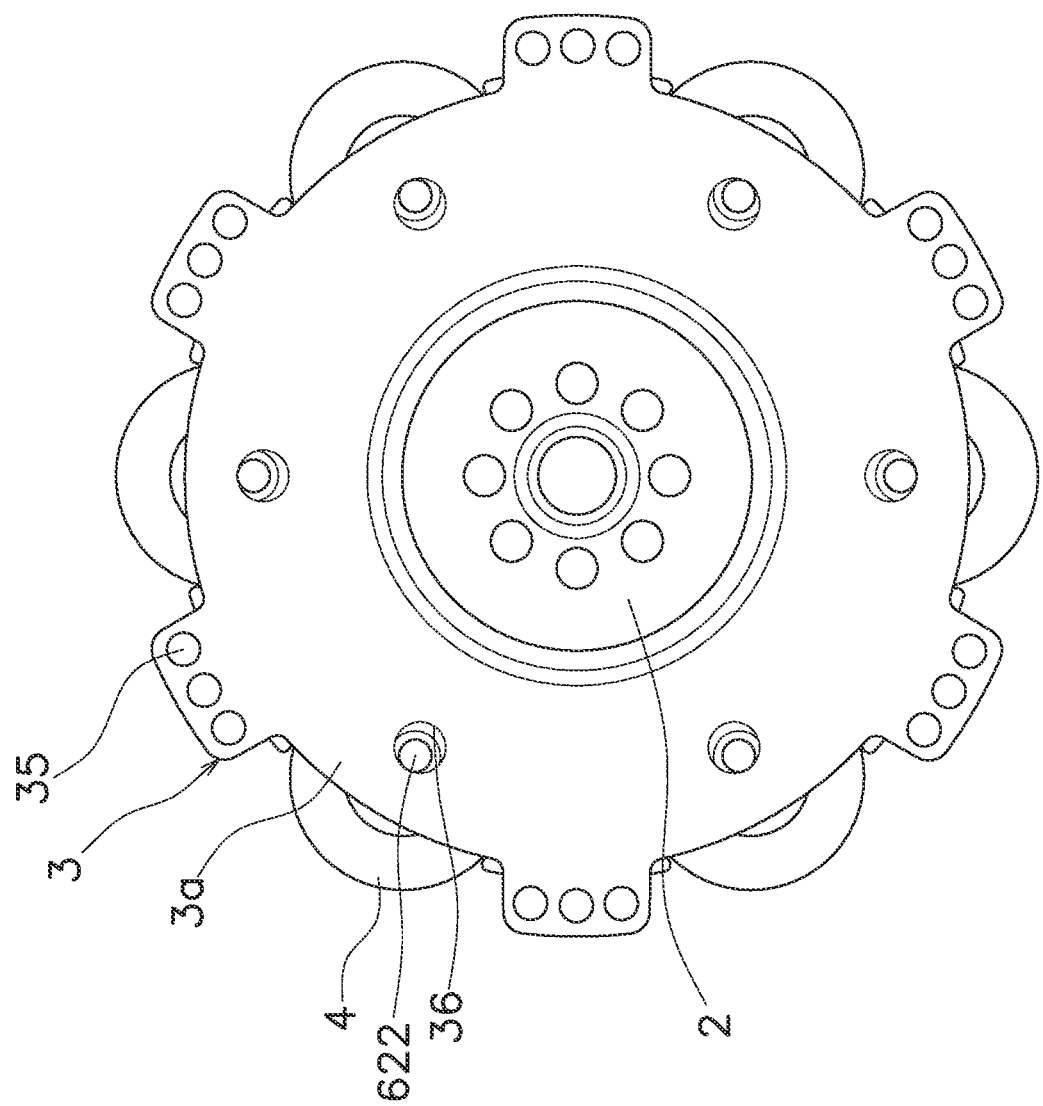
FIG. 5 is a front view of the torque fluctuation inhibiting device according to the first embodiment.

As shown in FIGS. 3 and 5, the inertia ring 3 is made in shape of an annulus. The inertia ring 3 annularly extends in continuous manner. The inertia ring 3 functions as a mass body of the torque fluctuation inhibiting device 10. The inertia ring 3 is rotatable with the flange plate 2 and is also rotatable relative to the flange plate 2. The inertia ring 3 has a rotational axis common to that of the flange plate 2.

The inertia ring 3 is disposed axially apart from the flange plate 2 at intervals. Besides, the inertia ring 3 is disposed axially apart from the centrifugal elements 4 at intervals.

The inertia ring 3 is composed of the first and second plates 3a and 3b. The first and second plates 3a and 3b are disposed such that the flange plate 2 is axially interposed therebetween.

The first and second plates 3a and 3b are disposed axially apart from the flange plate 2 at predetermined gaps. It should be noted that the first and second plates 3a and 3b make contact at the inner peripheral ends thereof with the flange plate 2. A pair of slide plates can be interposed both between the flange plate 2 and the inner peripheral end of the first plate 3a and between the flange plate 2 and the inner peripheral end of the second plate 3b. The pair of slide plates has a smaller friction coefficient than each of the flange plate 2 and the first and second plates 3a and 3b.

The second plate 3b is disposed to be contactable at the inner peripheral surface thereof to the outer peripheral surface of a flange portion 14a of the output hub 14. Thus, the inertia ring 3 is radially supported by the output hub 14.

The first and second plates 3a and 3b are fixed to each other by a plurality of rivets 35. Therefore, the first and second plates 3a and 3b are immovable from each other in the axial, radial, and circumferential directions. In other words, the first and second plates 3a and 3b are unitarily rotated with each other.

As shown in FIG. 5, the first plate 3a includes a plurality of second through holes 36. The respective second through holes 36 are aligned in the circumferential direction. The second through holes 36 extend in the axial direction. The second through holes 36 axially penetrate the first plate 3a. Each second through hole 36 is greater in diameter than each of a pair of small diameter portions 622 of each cam follower 62 (to be described). Besides, each second through hole 36 is less in diameter than a large diameter portion 621 of each cam follower 62.

The second plate 3b includes a plurality of second through holes 36 in similar manner to the first plate 3a. The second through holes 36 provided in the first plate 3a and those provided in the second plate 3b are identical in position to each other in both circumferential and radial directions.

As shown in FIG. 2, a plurality of inertia blocks 38 are disposed between the first and second plates 3a and 3b. The plural inertia blocks 38 are disposed apart from each other at intervals in the circumferential direction. For example, the inertia blocks 38 and the centrifugal elements 4 are alternately disposed in the circumferential direction. The inertia blocks 38 are fixed to the first and second plates 3a and 3b. Specifically, the inertia blocks 38 are fixed to the first and second plates 3a and 3b by the rivets 35. It should be noted that each inertia block 38 is greater in thickness than each centrifugal element 4.

<Centrifugal Elements 4>

The centrifugal elements 4 are supported, while being radially movable with respect to the flange plate 2. When described in detail, each centrifugal element 4 is disposed within each accommodation portion 24. Each centrifugal element 4 is configured to receive a centrifugal force generated by rotation of the flange plate 2. Each centrifugal element 4 is radially movable within each accommodation portion 24. It should be noted that each centrifugal element 4 is configured to rotate about a rotational axis thereof in radial movement thereof. In the present embodiment, each centrifugal element 4 entirely rotates about the rotational axis thereof. Each centrifugal element 4 is restricted from axially moving by each tilt preventing mechanism 9 to be described.

As shown in FIG. 4, each centrifugal element 4 is made in shape of a disc and includes a first through hole 41 in the middle part thereof. In other words, each centrifugal element 4 is made in shape of a tube or hollow cylinder. Each centrifugal element 4 is greater in thickness than the flange plate 2. Each centrifugal element 4 can be provided as a single member.

Each centrifugal element 4 is configured to roll on the inner wall surface of each accommodation portion 24. When described in detail, each centrifugal element 4 rolls on the inner wall surface of each accommodation portion 24 in radial movement thereof. It should be noted that each centrifugal element 4 rolls on the first and second guide surfaces 241 and 242 of the inner wall surface of each accommodation portion 24.

For example, when the inertia ring 3 is rotated clockwise relative to the flange plate 2, each centrifugal element 4 rolls on the first guide surface 241. Contrarily, when the inertia ring 3 is rotated counterclockwise relative to the flange plate 2, each centrifugal element 4 rolls on the second guide surface 242.

When rolling, each centrifugal element 4 rolls in contact at one part of the outer peripheral surface thereof with the first guide surface 241. This part is defined as a first contact surface 42a. Also, when rolling, each centrifugal element 4 rolls in contact at another part of the outer peripheral surface thereof with the second guide surface 242. This part is defined as a second contact surface 42b. The first and second contact surfaces 42a and 42b each have a circular-arc shape in the axial view.

Preferably, a distance between the first guide surface 241 and the second guide surface 242 is slightly greater than or equal to the diameter of each centrifugal element 4. It is herein assumed that the distance between the first guide surface 241 and the second guide surface 242 is slightly greater than the diameter of each centrifugal element 4. In this assumption, when the first contact surface 42a rolls on the first guide surface 241, the second contact surface 42b does not slide in contact with the second guide surface 242. Contrarily, when the second contact surface 42b rolls on the second guide surface 242, the first contact surface 42a does not slide in contact with the first guide surface 241.

The first through hole 41 extends in the axial direction. The first through hole 41 penetrates each centrifugal element 4 in the axial direction. The first through hole 41 is greater in diameter than each cam follower 62. When described in detail, the first through hole 41 is greater in diameter than the large diameter portion 621 of each cam follower 62. The inner wall surface of each centrifugal element 4, by which the first through hole 41 is delimited, is provided in part as a cam surface 61.

<Cam Mechanisms 6>

Each cam mechanism 6 is configured to receive a centrifugal force acting on each centrifugal element 4 and convert the centrifugal force into a circumferential force directed to reduce the rotational phase difference between the flange plate 2 and the inertia ring 3. It should be noted that each cam mechanism 6 functions when the rotational phase difference is produced between the flange plate 2 and the inertia ring 3.

Each cam mechanism 6 includes the cam surface 61 and the cam follower 62 (exemplary support member). The cam surface 61 is provided on each centrifugal element 4. When described in detail, the cam surface 61 is part of the inner wall surface of the first through hole 41 of each centrifugal element 4. The cam surface 61 is a surface, with which the cam follower 62 makes contact, and has a circular-arc shape in the axial view. The cam surface 61 faces radially outward.

The cam follower 62 makes contact with the cam surface 61. The cam follower 62 is configured to transmit a force therethrough between each centrifugal element 4 and the inertia ring 3. When described in detail, the cam follower 62 extends inside both the first through hole 41 and each pair of second through holes 36 of the pair of plates 3a and 3b composing the inertia ring 3. The cam follower 62 is attached to the inertia ring 3, while being rotatable about a rotational axis thereof.

The cam follower 62 rolls on the cam surface 61 of the first through hole 41. Besides, the cam follower 62 rolls on the inner wall surfaces of each pair of second through holes 36 of the pair of plates 3a and 3b. It should be noted that the cam follower 62 makes contact with regions (i.e., regions facing radially inward) of the inner wall surfaces of each pair of second through holes 36 of the pair of plates 3a and 3b. In other words, the cam follower 62 is interposed between the cam surface 61 and the inner wall surfaces of each pair of second through holes 36 of the pair of plates 3a and 3b.

When described in detail, the cam follower 62 makes contact with the cam surface 61 on the radially inner side, while making contact with the inner wall surfaces of each pair of second through holes 36 of the pair of plates 3a and 3b on the radially outer side. This results in positioning of the cam follower 62. Moreover, with the configuration that the cam follower 62 is thus interposed between the cam surface 61 and the inner wall surfaces of each pair of second through holes 36 of the pair of plates 3a and 3b, the cam follower 62 transmits a force therethrough between each centrifugal element 4 and the pair of plates 3a and 3b composing the inertia ring 3.

The cam follower 62 is provided as a roller made in shape of a column or solid cylinder. In other words, the cam follower 62 is not a bearing. The cam follower 62 includes the large diameter portion 621 and the pair of small diameter portions 622. The center of the large diameter portion 621 is identical in position to that of each small diameter portion 622. The large diameter portion 621 is greater in diameter than each small diameter portion 622. The large diameter portion 621 is less in diameter than the first through hole 41 but is greater in diameter than each second through hole 36. The large diameter portion 621 rolls on the cam surface 61.

The pair of small diameter portions 622 protrudes from the large diameter portion 621 to both sides in the axial direction. The pair of small diameter portions 622 rolls on the inner wall surfaces of each pair of second through holes 36 of the pair of plates 3a and 3b. Each small diameter portion 622 is less in diameter than each second through hole 36. The cam follower 62 can be provided as a single member. In other words, the large diameter portion 621 and the pair of small diameter portions 622 in the cam follower 62 are provided as a single member. It should be noted that the cam follower 62 can be made in shape of a column or solid cylinder with a constant diameter. Alternatively, the cam follower 62 can be made in shape of a tube or hollow cylinder.

When the rotational phase difference is produced between the flange plate 2 and the inertia ring 3 by the contact between the cam follower 62 and the cam surface 61 and the contact between the cam follower 62 and the inner wall surfaces of each pair of second through holes 36 of the pair of plates 3a and 3b composing the inertia ring 3, the centrifugal force generated in each centrifugal element 4 is converted into the circumferential force by which the rotational phase difference is reduced.

The cam follower 62 also exerts a function of supporting each centrifugal element 4 from radially outside when each centrifugal element 4 is moved radially outward.

<Tilt Preventing Mechanisms>

As shown in FIG. 3, each tilt preventing mechanism 9 is configured to prevent each centrifugal element 4 from tilting. It should be noted that tilting of each centrifugal element 4 means that directions within a plane of each centrifugal element 4 slant with respect to a plane orthogonal to the rotational axis O. When each centrifugal element 4 is not tilted, the directions within the plane of each centrifugal element 4 extend substantially in parallel to the plane orthogonal to the rotational axis O.

Figure 6:
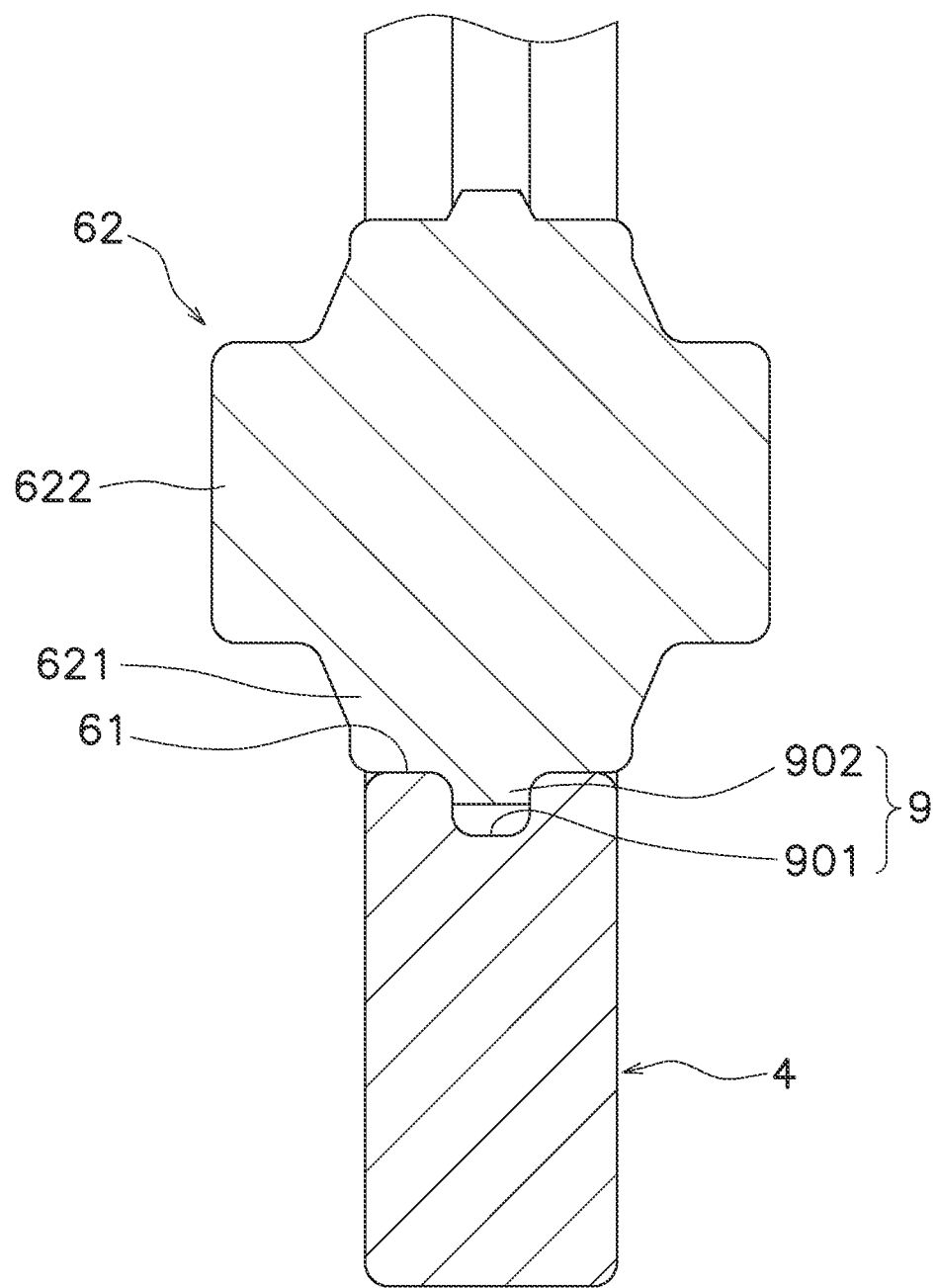
FIG. 6 is an enlarged cross-sectional view of a tilt preventing mechanism according to the first embodiment.

Each tilt preventing mechanism 9 is configured to restrict each centrifugal element 4 from axially moving with respect to the cam follower 62. Specifically, as shown in FIG. 6, each tilt preventing mechanism 9 includes a groove 901 and a protrusion 902. It should be noted that FIG. 6 is an enlarged cross-sectional diagram only showing tilt preventing mechanism 9—related portions extracted from the torque fluctuation inhibiting device 10.

The groove 901 is provided on the inner wall surface of the first through hole 41 of each centrifugal element 4. When described in detail, the groove 901 is provided on the cam surface 61 of each centrifugal element 4. The groove 901 is disposed on an axially middle part of the cam surface 61. The groove 901 annularly extends along the inner wall surface of the first through hole 41.

The protrusion 902 is provided on the outer peripheral surface of the cam follower 62. When described in detail, the protrusion 902 is provided on the outer peripheral surface of the large diameter portion 621 of the cam follower 62. The protrusion 902 is disposed on an axially middle part of the outer peripheral surface of the large diameter portion 621. The protrusion 902 annularly extends along the outer peripheral surface of the large diameter portion 621.

The protrusion 902 is disposed within the groove 901. It should be noted that the distal end surface of the protrusion 902 is not in contact with the bottom surface of the groove 901, but alternatively, can be in contact therewith. Thus, with engagement between the protrusion 902 provided on the cam follower 62 and the groove 901 provided on each centrifugal element 4, each centrifugal element 4 is not axially moved with respect to the cam follower 62. Because of this, each centrifugal element 4 is stably supported by the cam follower 62. As a result, tilting of each centrifugal element 4 can be prevented.

Figure 7:
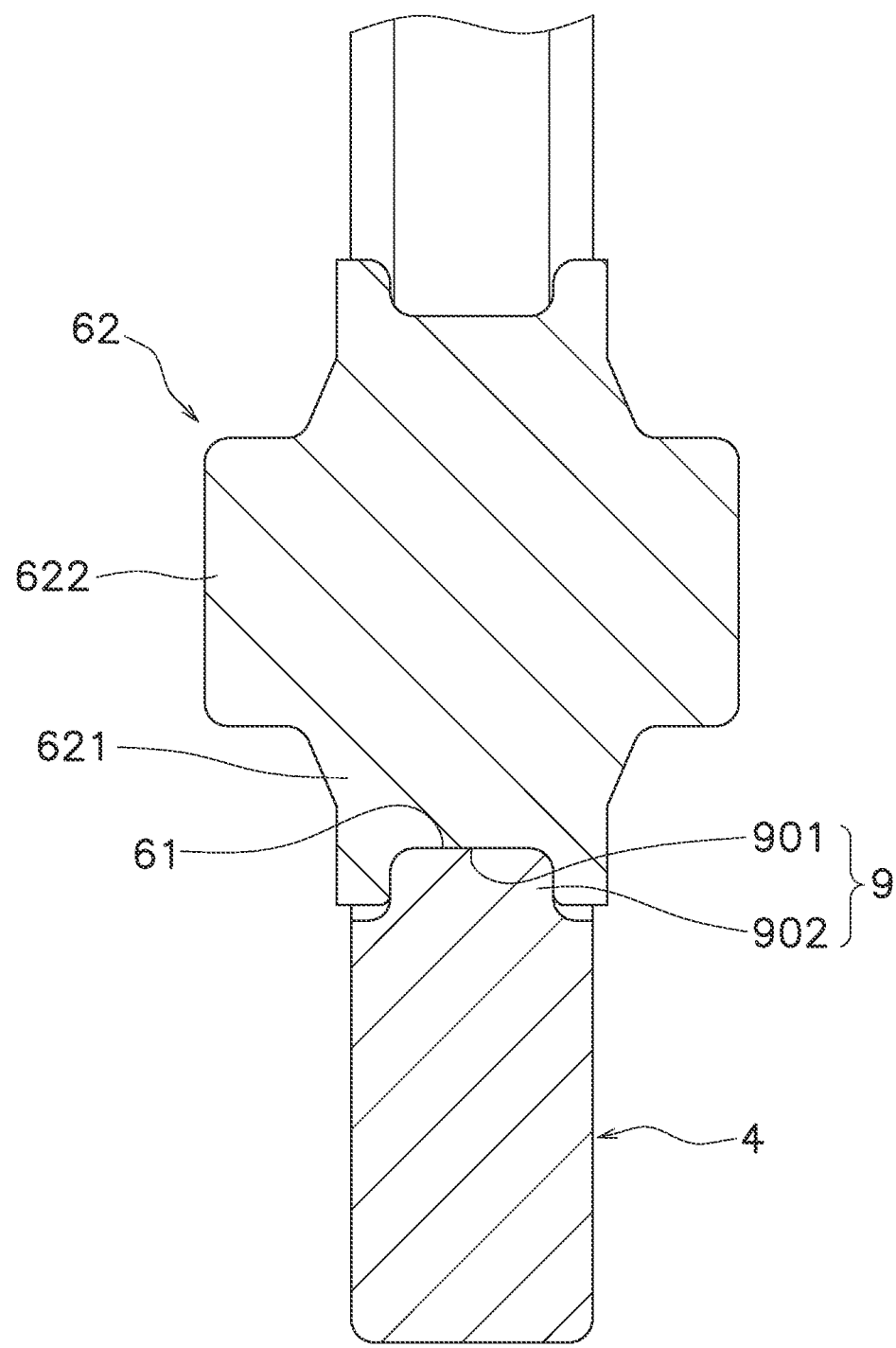
FIG. 7 is an enlarged cross-sectional view of an alternative tilt preventing mechanism according to the first embodiment.

It should be noted that as shown in FIG. 7, the groove 901 can be provided on the cam follower 62, whereas the protrusion 902 can be provided on each centrifugal element 4. When the protrusion 902 has a large axial dimension as shown in FIG. 7, the distal end surface of the protrusion 902 can be in contact with the groove 901. Besides, the distal end surface of the protrusion 902 can be provided as the cam surface 61.

<Stopper Mechanisms 8>

As shown in FIG. 4, the torque fluctuation inhibiting device 10 further includes stopper mechanisms 8. The stopper mechanisms 8 restrict relative rotation between the flange plate 2 and the inertia ring 3 to a predetermined angular range. Each stopper mechanism 8 includes a protrusion 81 and a recess 82.

The protrusion 81 protrudes radially inward from each inertia block 38. The recess 82 is provided on the outer peripheral surface of the flange plate 2. The protrusion 81 is disposed within the recess 82. The relative rotation between the flange plate 2 and the inertia ring 3 is restricted to the predetermined angular range by the contact of the protrusion 81 with each of the end surfaces of the recess 82.

[Actuation of Torque Fluctuation Inhibiting Device 10]

Actuation of the torque fluctuation inhibiting device 10 will be explained with FIGS. 8 and 9.

In the lock-up on state, a torque transmitted to the front cover 11 is transmitted to the flange plate 2 through the input-side rotor 131 and the damper 132.

Figure 8:
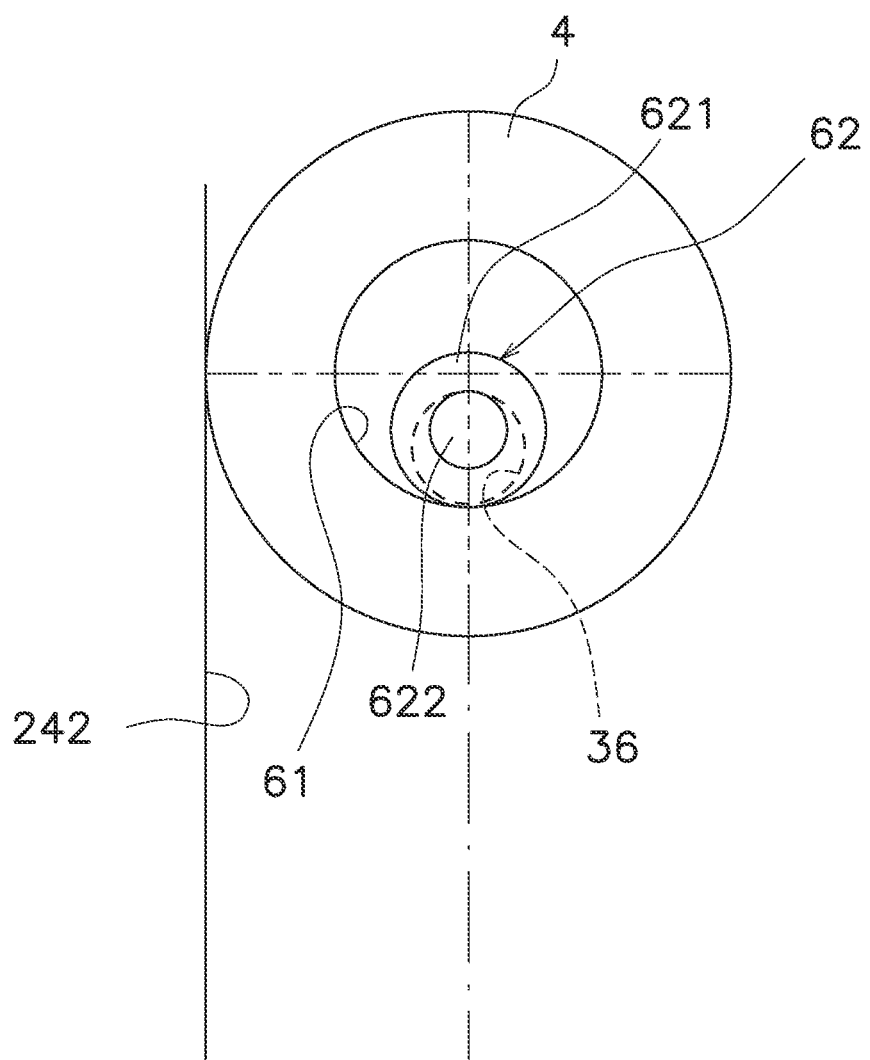
FIG. 8 is a diagram roughly showing a positional relation among a centrifugal element, a cam follower and an inertia ring in a condition without input of torque fluctuations.

When torque fluctuations do not exist in torque transmission, the flange plate 2 and the inertia ring 3 are rotated in a condition shown in FIG. 8. In this condition, the cam follower 62 in each cam mechanism 6 makes contact with a radial innermost position (circumferential middle position) of the cam surface 61. Besides, in this condition, the rotational phase difference between the flange plate 2 and the inertia ring 3 is "0".

As described above, the circumferential relative displacement between the flange plate 2 and the inertia ring 3 is referred to as "rotational phase difference". In FIGS. 8 and 9, these terms indicate displacement between the circumferential middle position of both each centrifugal element 4 and the cam surface 61 thereof and the center position of each pair of second through holes 36 of the pair of plates 3a and 3b composing the inertia ring 3.

Figure 9:
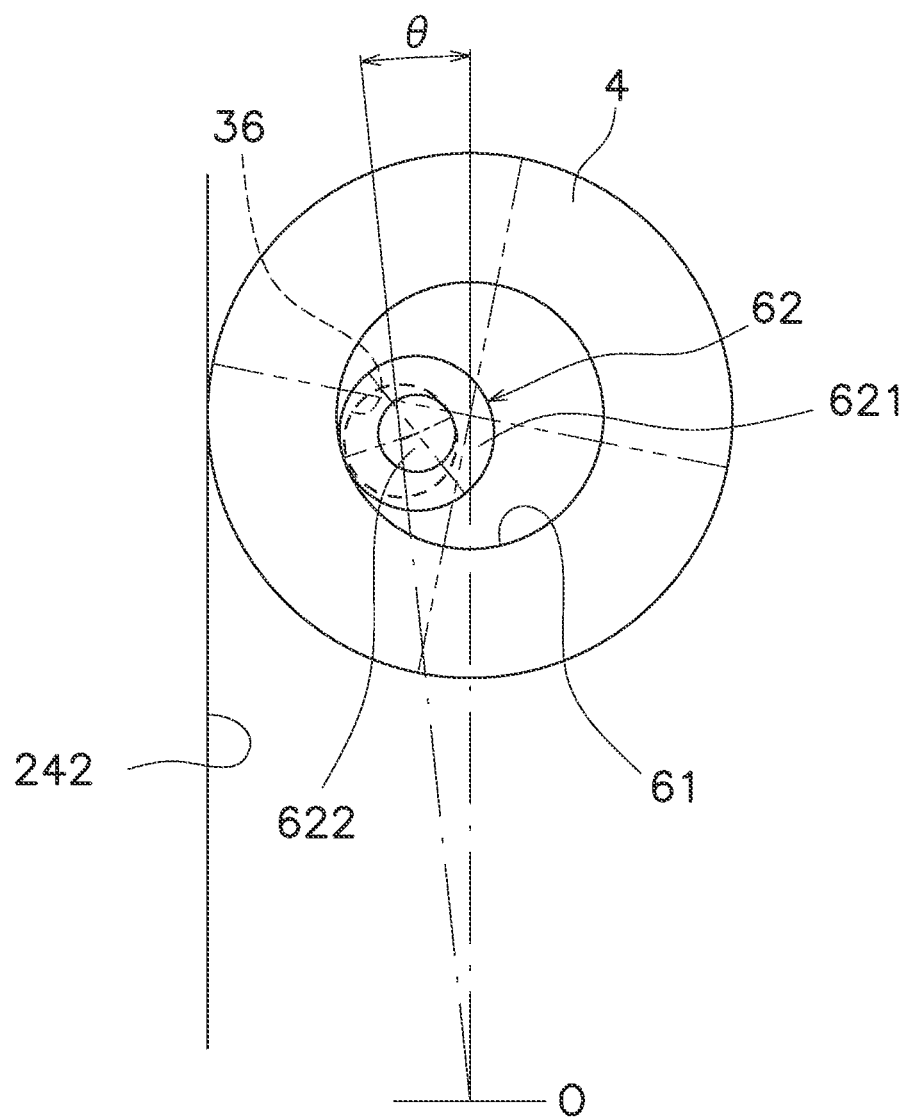
FIG. 9 is a diagram roughly showing a positional relation among the centrifugal element, the cam follower and the inertia ring in a condition with input of torque fluctuations.

When torque fluctuations herein exist in torque transmission, rotational phase difference θ is produced between the flange plate 2 and the inertia ring 3 as shown in FIG. 9.

As shown in FIG. 9, when the rotational phase difference θ is produced between the flange plate 2 and the inertia ring 3, the com follower 62 in each cam mechanism 6 is moved from a position shown in FIG. 8 to a position shown in FIG. 9. At this time, the cam follower 62 is relatively moved to the left side, while rolling on the cam surface 61. Besides, the cam follower 62 also rolls on the inner wall surfaces of each pair of second through holes 36 of the pair of plates 3a and 3b composing the inertia ring 3. When described in detail, the large diameter portion 621 of the cam follower 62 rolls on the cam surface 61, whereas the pair of small diameter portions 622 of the cam follower 62 rolls on the inner wall surfaces of each pair of second through holes 36 of the pair of plates 3a and 3b. It should be noted that the cam follower 62 rotates counterclockwise about the rotational axis thereof.

When moved to the left side, the cam follower 62 presses the centrifugal element 4 radially inward (downward in FIGS. 8 and 9) through the cam surface 61, whereby the centrifugal element 4 is moved radially inward. As a result, the centrifugal element 4 is moved from a position shown in FIG. 8 to a position shown in FIG. 9. At this time, the centrifugal element 4 rolls on the second guide surface 242. The centrifugal element 4 rotates clockwise about the rotational axis thereof.

A centrifugal force is acting on the centrifugal element 4 moved to the position shown in FIG. 9 as described above. Hence, the centrifugal element 4 is moved radially outward (upward in FIG. 9). When described in detail, the centrifugal element 4 is moved radially outward, while rolling on the second guide surface 242. It should be noted that the centrifugal element 4 rotates counterclockwise about the rotational axis thereof.

Besides, the cam surface 61 provided on the centrifugal element 4 presses the inertia ring 3 through the cam follower 62 to the right side in FIG. 9, whereby the inertia ring 3 is moved to the right side in FIG. 9. At this time, the large diameter portion 621 of the cam follower 62 rolls on the cam surface 61, whereas the pair of small diameter portions 622 of the cam follower 62 rolls on the inner wall surfaces of each pair of second through holes 36 of the pair of plates 3a and 3b composing the inertia ring 3. It should be noted that the cam follower 62 rotates clockwise about the rotational axis thereof. As a result, the condition shown in FIG. 8 is restored.

It should be noted that when the rotational phase difference is reversely produced, the cam follower 62 is relatively moved along the cam surface 61 to the right side in FIG. 9. However, the actuation principle described above is also true of this case. At this time, the centrifugal element 4 rolls on the first guide surface 241.

As described above, when the rotational phase difference is produced between the flange plate 2 and the inertia ring 3 by torque fluctuations, the flange plate 2 receives the circumferential force directed to reduce the rotational phase difference between the both by the centrifugal force acting on each centrifugal element 4 and the working of each cam mechanism 6. Torque fluctuations are inhibited by this force.

It should be noted that a force is transmitted between each centrifugal element 4 and the inertia ring 3 through each cam follower 62.

The force described above, by which torque fluctuations are inhibited, varies in accordance with the centrifugal force, in other words, the rotational speed of the flange plate 2 and varies as well in accordance with the rotational phase difference and the shape of the cam surface 61. Therefore, by suitably setting the shape of the cam surface 61, characteristics of the torque fluctuation inhibiting device 10 can be made optimal in accordance with the specification of the engine and so forth.

Besides, each centrifugal element 4 is radially moved, while rolling on the first or second guide surface 241, 242. Because of this, each centrifugal element 4 is radially movable in smoother manner than that sliding on the first or second guide surface 241, 242. Moreover, each cam follower 62 rolls on the cam surface 61 and the inner wall surfaces of each pair of second through holes 36 of the pair of plates 3a and 3b composing the inertia ring 3. Because of this, a force can be transmitted between each centrifugal element 4 and the inertia ring 3 in as smooth manner as possible.

[Exemplary Characteristics]

Figure 10:
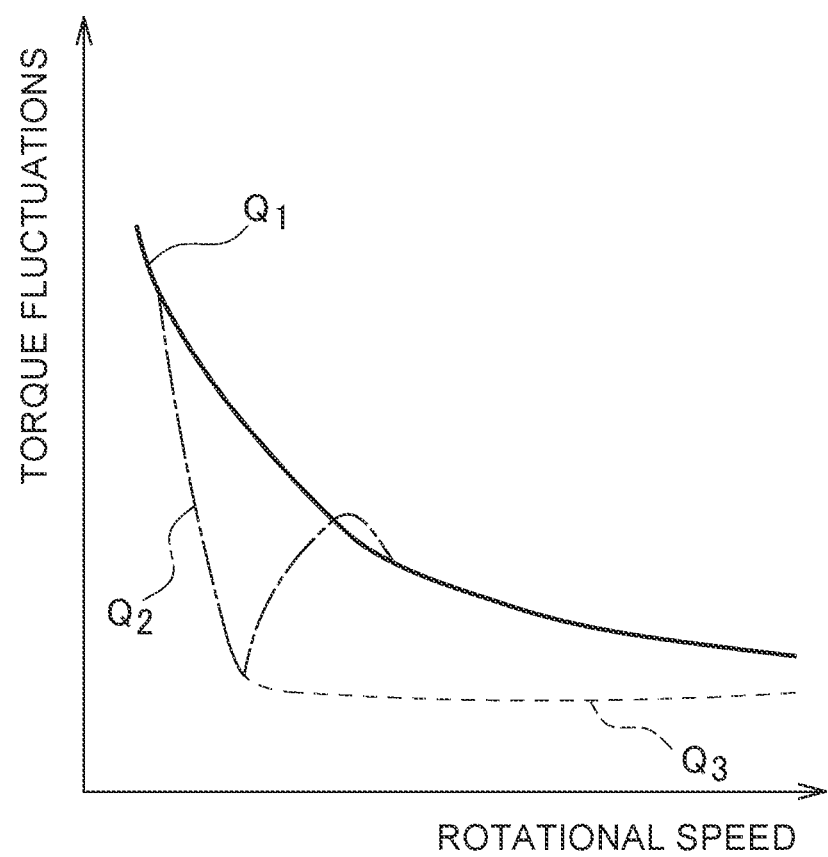
FIG. 10 is a chart showing exemplary characteristics of the torque fluctuation inhibiting device.

FIG. 10 is a chart showing exemplary characteristics of the torque fluctuation inhibiting device 10. The horizontal axis indicates rotational speed, whereas the vertical axis indicates torque fluctuations (rotational speed fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 10 of the present embodiment.

As is obvious from FIG. 10, in an apparatus in which the well-known dynamic damper device without any cam mechanism is installed (characteristic Q2), torque fluctuations can be inhibited only in a specific rotational speed range. By contrast, in the condition with installation of the torque fluctuation inhibiting device 10 with the cam mechanisms 6 of the present embodiment (characteristic Q3), torque fluctuations can be inhibited through the entire rotational speed ranges.

Second Embodiment

Next, the torque fluctuation inhibiting device 10 according to a second embodiment will be explained. It should be noted that the following explanation will be provided mainly regarding differences from the torque fluctuation inhibiting device 10 according to the first embodiment. In the second embodiment, when a given constituent element is the same as a comparative one of the torque fluctuation inhibiting device 10 according to the first embodiment, a reference sign assigned to the comparative one will be similarly assigned to the given constituent element, and explanation of the given constituent element will be omitted.

Figure 11:
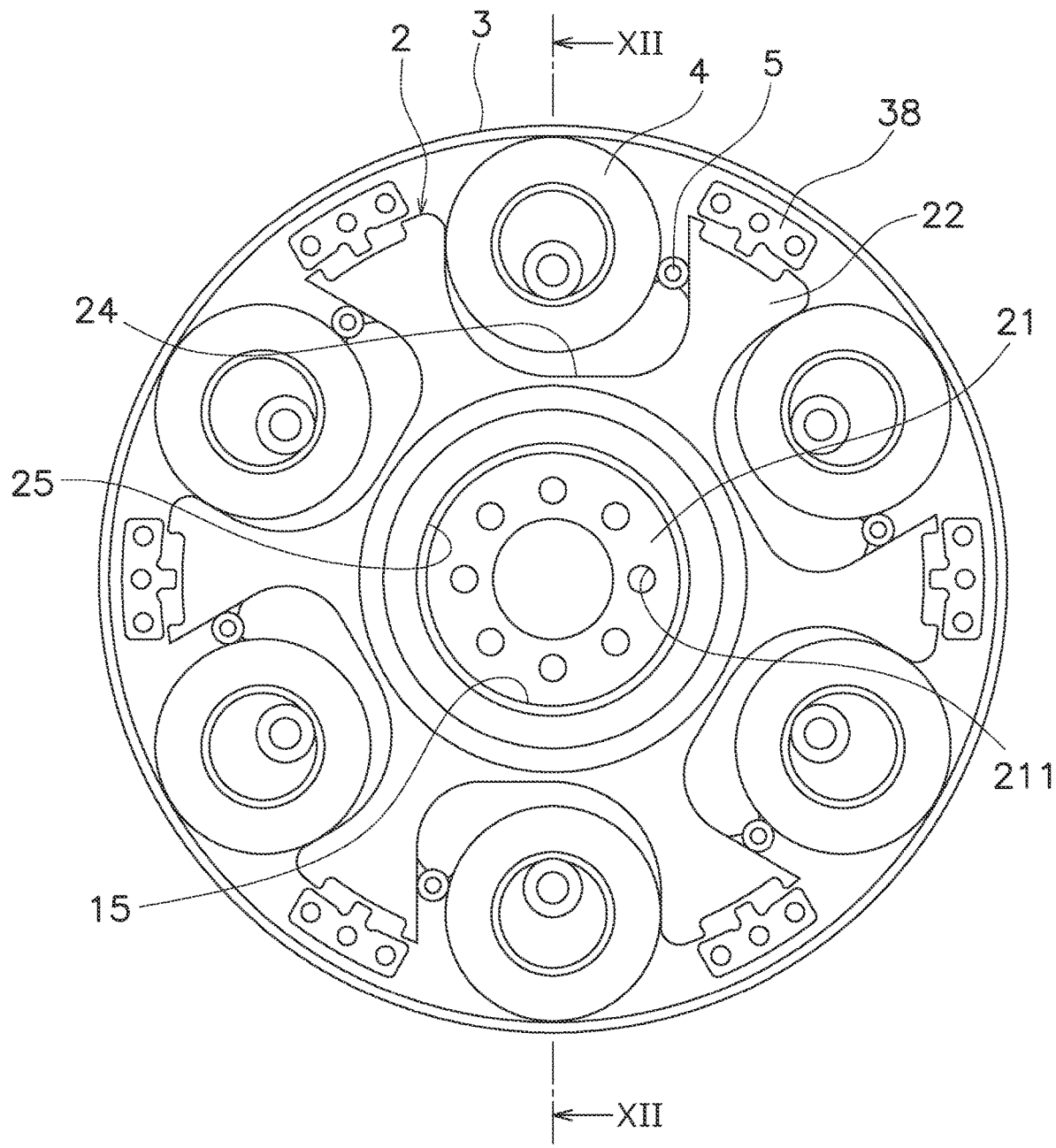
FIG. 11 is a front view of a torque fluctuation inhibiting device according to a second embodiment, from which a first plate is detached.
Figure 12:
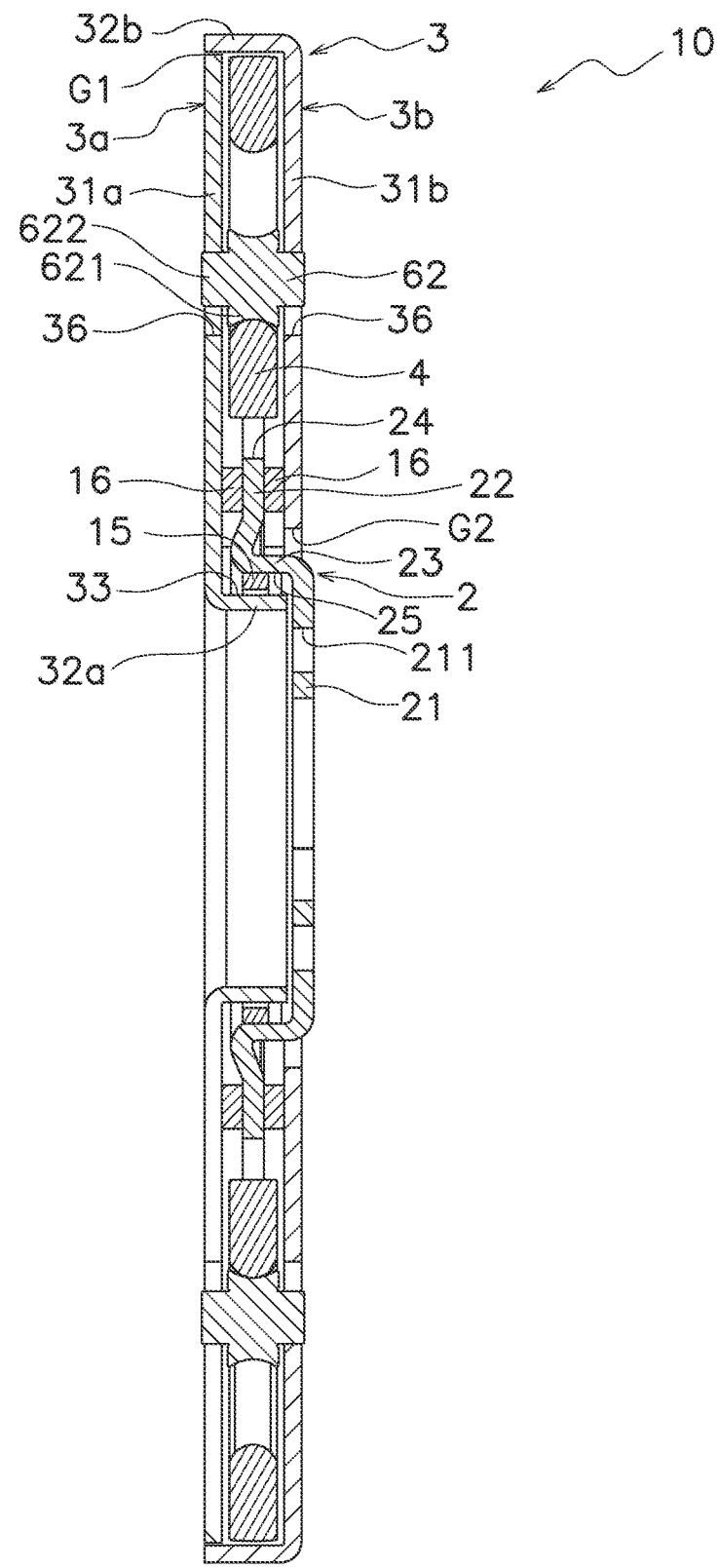
FIG. 12 is a cross-sectional view taken along line XII-XII in FIG. 11.

FIG. 11 is a front view of the torque fluctuation inhibiting device 10, whereas FIG. 12 is a cross-sectional view taken along line XII-XII in FIG. 11. It should be noted that the first plate 3a is detached in FIG. 11.

As shown in FIGS. 11 and 12, the torque fluctuation inhibiting device 10 according to the second embodiment includes a plurality of first rolling members 5, a slide member 15, and a pair of spacers 16, all of which are not included in the torque fluctuation inhibiting device 10 according to the first embodiment.

The flange plate 2 includes an inner peripheral portion 21, an outer peripheral portion 22, and a connecting portion 23. The inner peripheral portion 21 includes a plurality of attachment holes 211. The flange plate 2 is attached at the inner peripheral portion 21 to the output hub 14 by utilizing the attachment holes 211. It should be noted that the inner peripheral portion 21 is disposed outside an accommodation space (to be described).

As shown in FIG. 12, the outer peripheral portion 22 is accommodated in the accommodation space (to be described). The outer peripheral portion 22 is different in axial position from the inner peripheral portion 21. When described in detail, the outer peripheral portion 22 is disposed on a first side (left side in FIG. 12) of the inner peripheral portion 21 in the axial direction.

The connecting portion 23 connects the outer peripheral portion 22 and the inner peripheral portion 21 therethrough. When described in detail, the connecting portion 23 connects the outer peripheral end of the inner peripheral portion 21 and the inner peripheral end of the outer peripheral portion 22. The connecting portion 23 extends in the axial direction. The connecting portion 23 has a cylindrical shape.

The flange plate 2 includes a first support surface 25. When described in detail, the connecting portion 23 includes the first support surface 25. The inner peripheral surface of the connecting portion 23 is provided as the first support surface 25. The first support surface 25 faces radially inward. The first support surface 25 has an annular shape. In an axial view, the first support surface 25 has a circular shape.

The first plate 3a includes a first annular portion 31a and a first cylindrical portion 32a. The first annular portion 31a has an annular shape. The first annular portion 31a is disposed on the first side of the flange plate 2 in the axial direction. The first annular portion 31a is disposed axially apart from the flange plate 2 at an interval.

The first cylindrical portion 32a extends from the inner peripheral end of the first annular portion 31a toward the second plate 3b in the axial direction. In other words, the first cylindrical portion 32a extends from the inner peripheral end of the first annular portion 31a to a second side in the axial direction.

The first cylindrical portion 32a is disposed radially inside the connecting portion 23. The first cylindrical portion 32a includes a second support surface 33. Specifically, the outer peripheral surface of the first cylindrical portion 32a is provided as the second support surface 33.

The second support surface 33 faces radially outward. The second support surface 33 is configured to be supported by the first support surface 25. When described in detail, the second support surface 33 is configured to be supported by the first support surface 25 through the slide member 15. In the present embodiment, a gap is produced between the second support surface 33 and the slide member 15. When the inertia ring 3 is radially moved, the second support surface 33 makes contact with the slide member 15. It should be noted that the gap may not be produced between the second support surface 33 and the slide member 15.

The second plate 3b includes a second annular portion 31b and a second cylindrical portion 32b. The second annular portion 31b has an annular shape. The second annular portion 31b is disposed on the second side of the flange plate 2 in the axial direction. The second annular portion 31b is disposed axially apart from the flange plate 2 at an interval.

The second annular portion 31b is disposed axially apart from the first annular portion 31a at an interval. The second annular portion 31b is disposed on the second side of the first annular portion 31a in the axial direction. The outer peripheral portion 22 of the flange plate 2 is disposed axially between the first and second annular portions 31a and 31b.

The second cylindrical portion 32b extends from the outer peripheral end of the second annular portion 31b toward the first plate 3a in the axial direction. In other words, the second cylindrical portion 32b extends from the outer peripheral end of the second annular portion 31b to the first side in the axial direction.

The second cylindrical portion 32b is disposed radially outside the outer peripheral portion 22 of the flange plate 2. The inner peripheral surface of the second cylindrical portion 32b is opposed to the outer peripheral surface of the outer peripheral portion 22 of the flange plate 2. The outer peripheral portion 22 of the flange plate 2 is disposed radially between the first and second cylindrical portions 32a and 32b. It should be noted that the outer peripheral portion 22 of the flange plate 2 is disposed axially between the first and second annular portions 31a and 31b. Thus, the first and second plates 3a and 3b form the accommodation space accommodating the outer peripheral portion 22 of the flange plate 2.

A first gap G1 is produced between the outer peripheral end of the first annular portion 31a and the distal end of the second cylindrical portion 32b. In other words, the outer peripheral surface of the first annular portion 31a is disposed apart from the inner peripheral surface of the second cylindrical portion 32b at an interval, while not in contact therewith. The first gap G1 can be provided over the entire range in the circumferential direction, or alternatively, can be provided only in part of the entire range in the circumferential direction. It should be noted that, while the outer peripheral surface of the first annular portion 31a makes contact with the inner peripheral surface of the second cylindrical portion 32b, the first gap G1 may not be produced therebetween.

A second gap G2 is produced between the inner peripheral end of the second annular portion 31b and the distal end of the first cylindrical portion 32a. In other words, the inner peripheral surface of the second annular portion 31b is disposed apart from the outer peripheral surface of the first cylindrical portion 32a at an interval, while not in contact therewith. The second gap G2 is produced over the entire range in the circumferential direction, but alternatively, can be produced only in part of the entire range in the circumferential direction. In the flange plate 2, the connecting portion 23 connects the inner peripheral portion 21 and the outer peripheral portion 22, while passing through the second gap G2.

Figure 13:
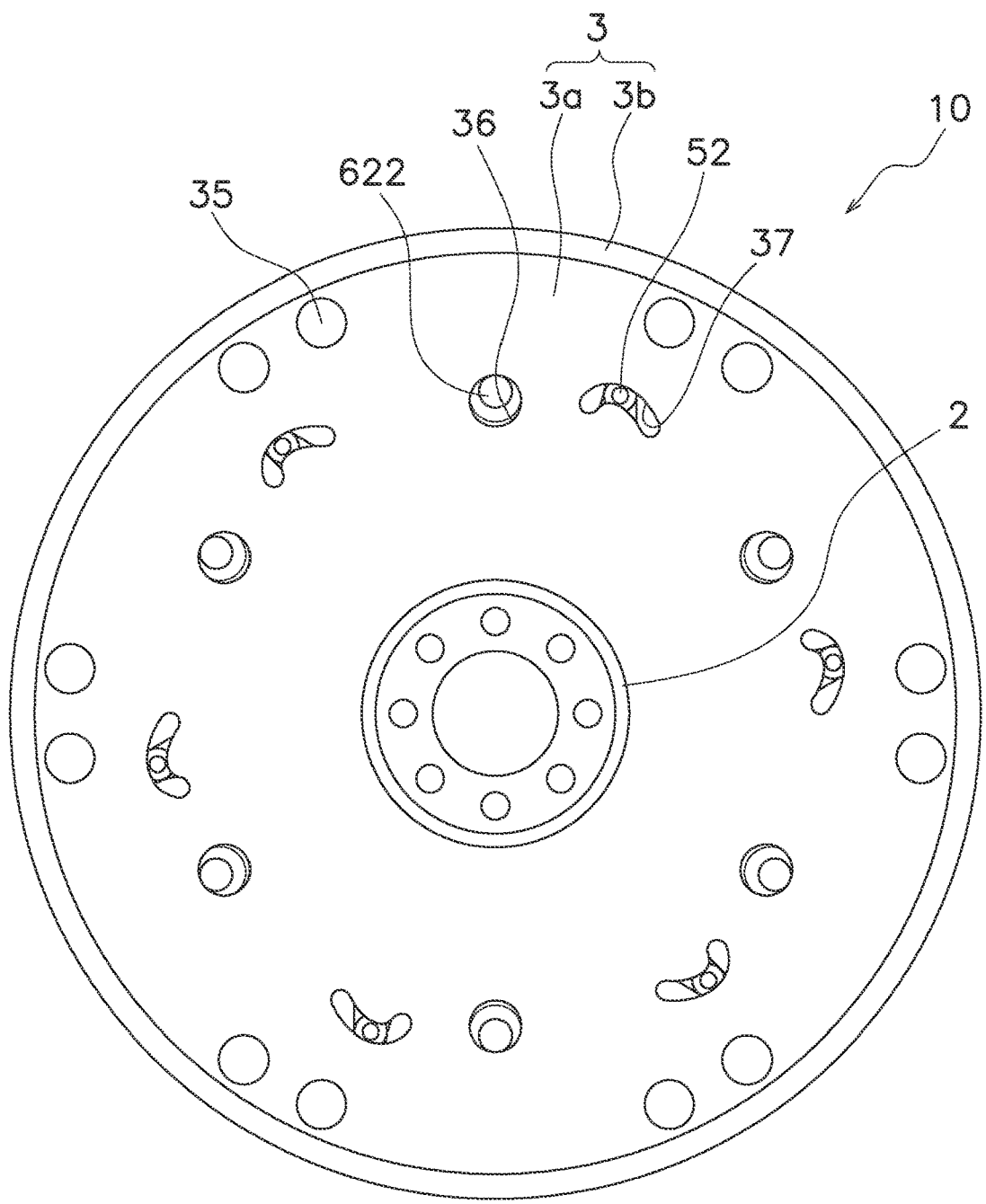
FIG. 13 is a front view of the torque fluctuation inhibiting device according to the second embodiment.

As shown in FIG. 13, the first plate 3a includes a plurality of restriction grooves 37. When described in detail, the first annular portion 31a includes the plural restriction grooves 37. The respective restriction grooves 37 are aligned in the circumferential direction. Each restriction groove 37 is made in shape of a circular arc protruding radially outward.

The second plate 3b includes a plurality of restriction grooves 37 in similar manner to the first plate 3a. Besides, the restriction grooves 37 provided in the first plate 3a and those provided in the second plate 3b are identical in position to each other in both circumferential and radial directions.

As shown in FIGS. 11 and 12, the slide member 15 is disposed between the first and second support surfaces 25 and 33. When described in detail, the slide member 15 is attached to the first support surface 25. The slide member 15 has an annular shape. The slide member 15 is press-fitted to the interior of the connecting portion 23. It should be noted that the flange plate 2 is greater in plate thickness than each first/second plate 3a, 3b.

The slide member 15 is made of a material lower in friction coefficient than that of the flange plate 2. Besides, the material of the slide member 15 is lower in friction coefficient than that of the inertia ring 3. For example, the slide member 15 can be made of resin, more specifically, polytetrafluoroethylene (PTFE), polyether ether ketone (PEEK), thermoplastic polyimide (TPI), or so forth.

The second support surface 33 is configured to be supported by the first support surface 25 through the slide member 15.

The inertia ring 3 has a center of gravity that overlaps not only the first support surface 25 but also the second support surface 33 in a radial view. It should be noted that, as with the present embodiment, when the second support surface 33 is supported by the first support surface 25 through the slide member 15, the center of gravity of the inertia ring 3 overlaps all the first support surface 25, the second support surface 33, and the slide member 15 in the radial view.

The pair of spacers 16 is disposed axially between the flange plate 2 and the inertia ring 3. When described in detail, either of the pair of spacers 16 is disposed between the outer peripheral portion 22 and the first plate 3a, whereas the other of the pair of spacers 16 is disposed between the outer peripheral portion 22 and the second plate 3b.

The pair of spacers 16 has an annular shape. The pair of spacers 16 can be fixed to the flange plate 2, or alternatively, can be fixed to the inertia ring 3. The pair of spacers 16 is made of a material lower in friction coefficient than that of the flange plate 2 or that of the inertia ring 3. Specifically, the pair of spacers 16 can be made of resin, more specifically, polytetrafluoroethylene (PTFE), polyether ether ketone (PEEK), thermoplastic polyimide (TPI), or so forth.

Figure 14:
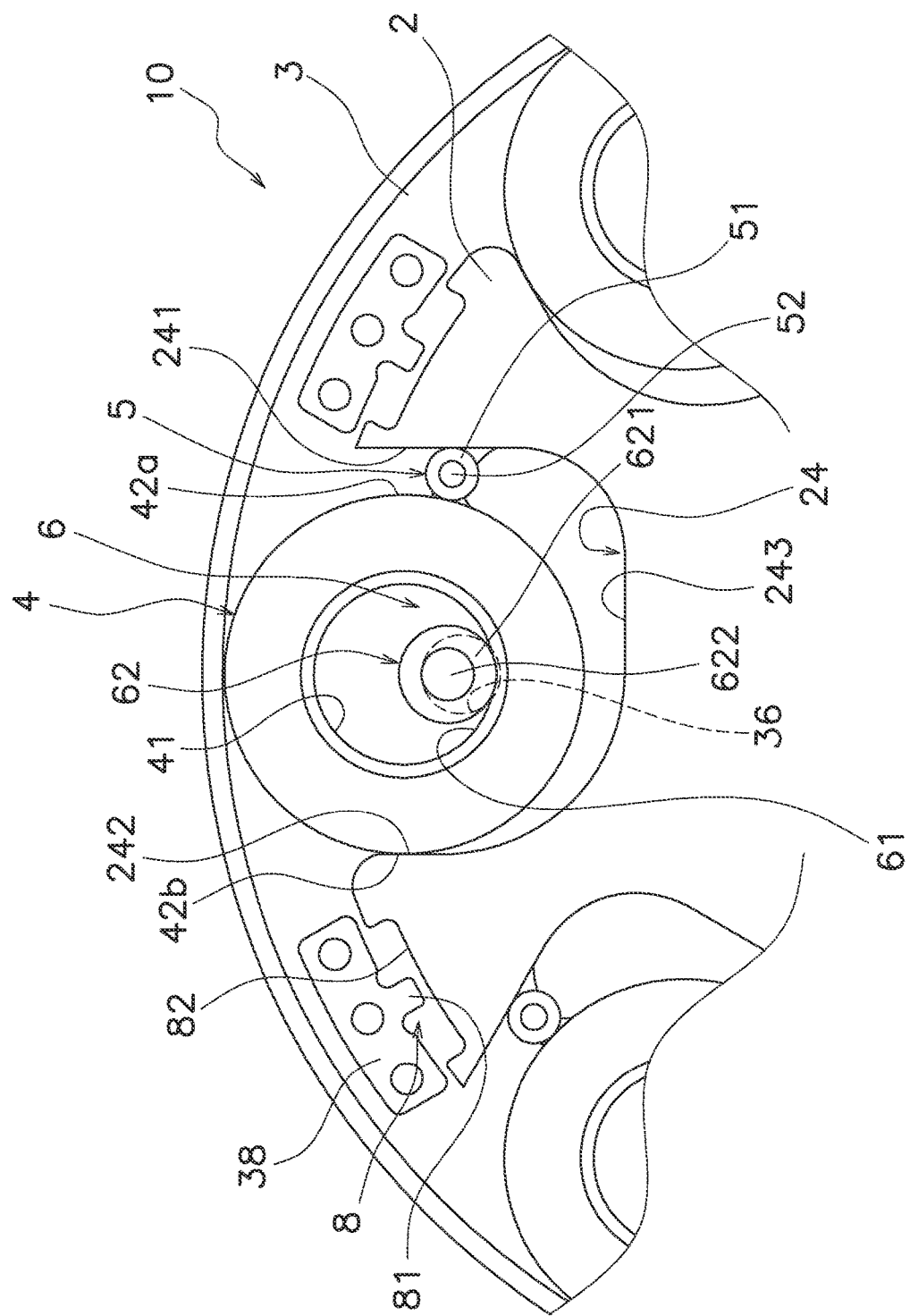
FIG. 14 is an enlarged front view of the torque fluctuation inhibiting device according to the second embodiment.

As shown in FIG. 14, each centrifugal element 4 makes contact with the second guide surface 242 and each first rolling member 5. Because of this, each centrifugal element 4 is restricted from circumferentially moving. On the other hand, each centrifugal element 4 is radially movable. Each centrifugal element 4 rolls on the second guide surface 242 of each accommodation portion 24 in radial movement thereof. Besides, each centrifugal element 4 rolls on the first guide surface 241 through each first rolling member 5 in radial movement thereof. In other words, each centrifugal element 4 rolls on the outer peripheral surface of each first rolling member 5.

When rolling, each centrifugal element 4 rolls in contact at one part of the outer peripheral surface thereof with the outer peripheral surface of each first rolling member 5. This part is defined as a first contact surface 42a.

Each first rolling member 5 is disposed between the first guide surface 241 and each centrifugal element 4. When described in detail, each first rolling member 5 is interposed between the first guide surface 241 and each centrifugal element 4. Each first rolling member 5 makes contact with the first guide surface 241 and each centrifugal element 4.

The center of each first rolling member 5 is located radially inside that of each centrifugal element 4. Each first rolling member 5 is provided as a roller made in shape of a column or solid cylinder. In other words, each first rolling member 5 is not a bearing.

Each first rolling member 5 includes a large diameter portion 51 and a pair of small diameter portions 52. The center of the large diameter portion 51 is identical in position to that of each small diameter portion 52. The large diameter portion 51 is greater in diameter than each small diameter portion 52. The diameter of the large diameter portion 51 is greater than the width of each restriction groove 37. Because of this, each first rolling member 5 is axially supported by the first plate 3a and the second plate 3b.

The pair of small diameter portions 52 protrudes from the large diameter portion 51 to both sides in the axial direction. The diameter of each small diameter portion 52 is less than the width of each restriction groove 37. The pair of small diameter portions 52 is disposed within each pair of restriction grooves 37 of the first and second plates 3a and 3b composing the inertia ring 3. A predetermined gap is produced between each small diameter portion 52 and the inner wall surface of each restriction groove 37, whereby each small diameter portion 52 is smoothly movable within each restriction groove 37. Thus, with the configuration that the pair of small diameter portions 52 is disposed within each pair of restriction grooves 37, each first rolling member 5 can be restricted from radially moving in stop of the torque fluctuation inhibiting device 10. In other words, each first rolling member 5 is supported by each pair of restriction grooves 37.

Each first rolling member 5 can be provided as a single member. In other words, the large diameter portion 51 and the pair of small diameter portions 52 in each first rolling member 5 are provided as a single member. It should be noted that each first rolling member 5 can be made in shape of a column or solid cylinder with a constant diameter. Alternatively, each first rolling member 5 can be made in shape of a tube or hollow cylinder.

Each first rolling member 5 is configured to roll on the first guide surface 241 in accordance with rotation of each centrifugal element 4 about the rotational axis thereof. In other words, when each centrifugal element 4 rotates about the rotational axis thereof, each first rolling member 5 also rotates about a rotational axis thereof. It should be noted that each centrifugal element 4 and each first rolling member 5 rotate in opposite directions. Besides, each first rolling member 5 rolls on the first guide surface 241 by rotating about the rotational axis thereof. When described in detail, the large diameter portion 51 of each first rolling member 5 rolls on the first guide surface 241.

When rotation-directional relative displacement (i.e., rotational phase difference) is not produced between the flange plate 2 and the inertia ring 3, each small diameter portion 52 is located in approximately the lengthwise (i.e., circumferential) middle of each restriction groove 37 as shown in FIG. 13. When the rotational phase difference is then produced between the flange plate 2 and the inertia ring 3, each small diameter portion 52 is moved along each restriction groove 37.

Figure 15:
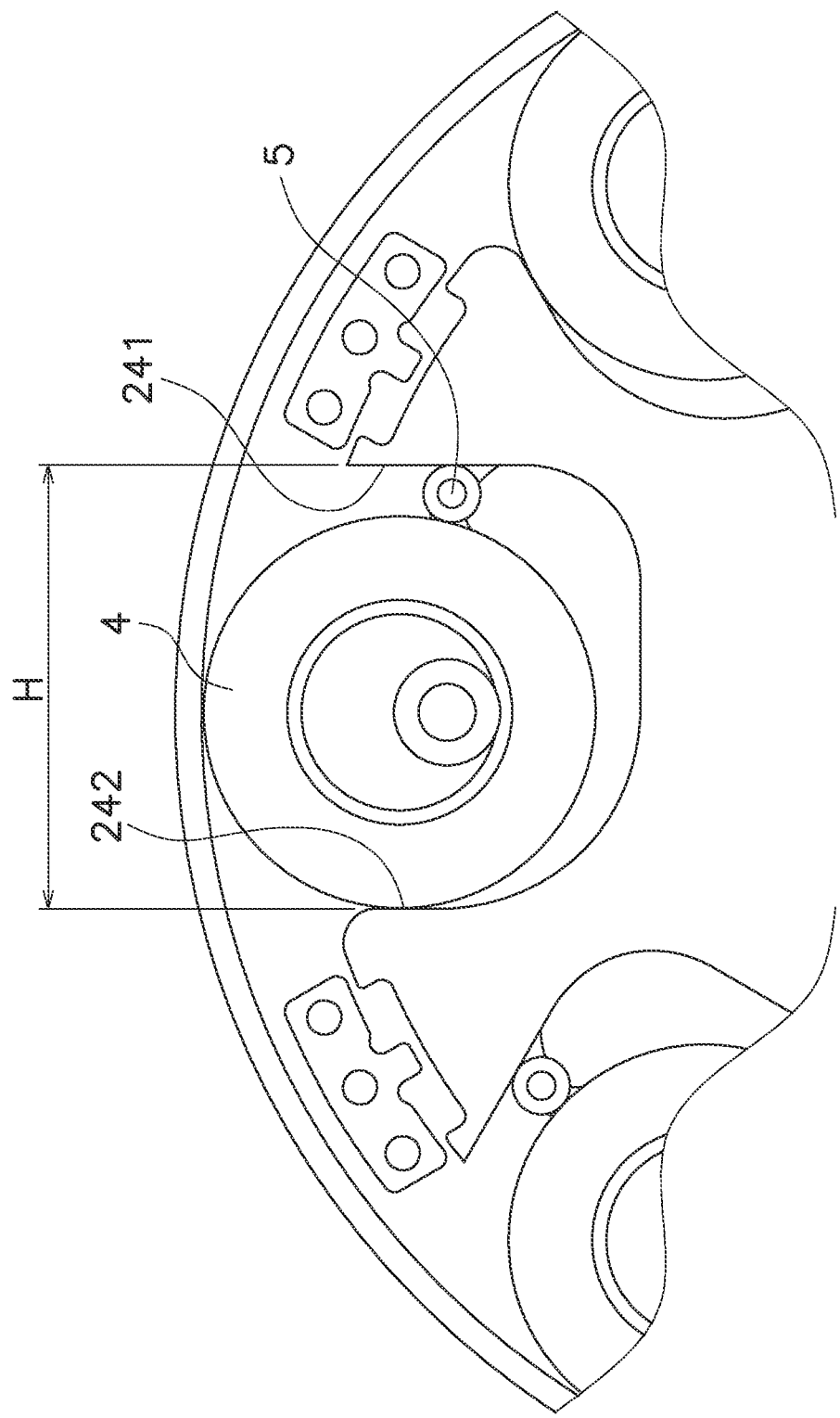
FIG. 15 is an enlarged front view of the torque fluctuation inhibiting device according to the second embodiment.

As shown in FIG. 15, a distance (H) between the first guide surface 241 and the second guide surface 242 is less than the sum of the diameter (D1) of each centrifugal element 4 and the diameter (D2) of each first rolling member 5. In other words, the relation "$H<D1+D2$" is established. Accordingly, during actuation of the torque fluctuation inhibiting device 10, each centrifugal element 4 constantly makes contact with the second guide surface 242 and each first rolling member 5.

The diameter (D2) of each first rolling member 5 is greater than a gap between the first guide surface 241 and the outer peripheral surface of each centrifugal element 4. Hence, each first rolling member 5 is restricted from jumping out radially outward.

Figure 16:
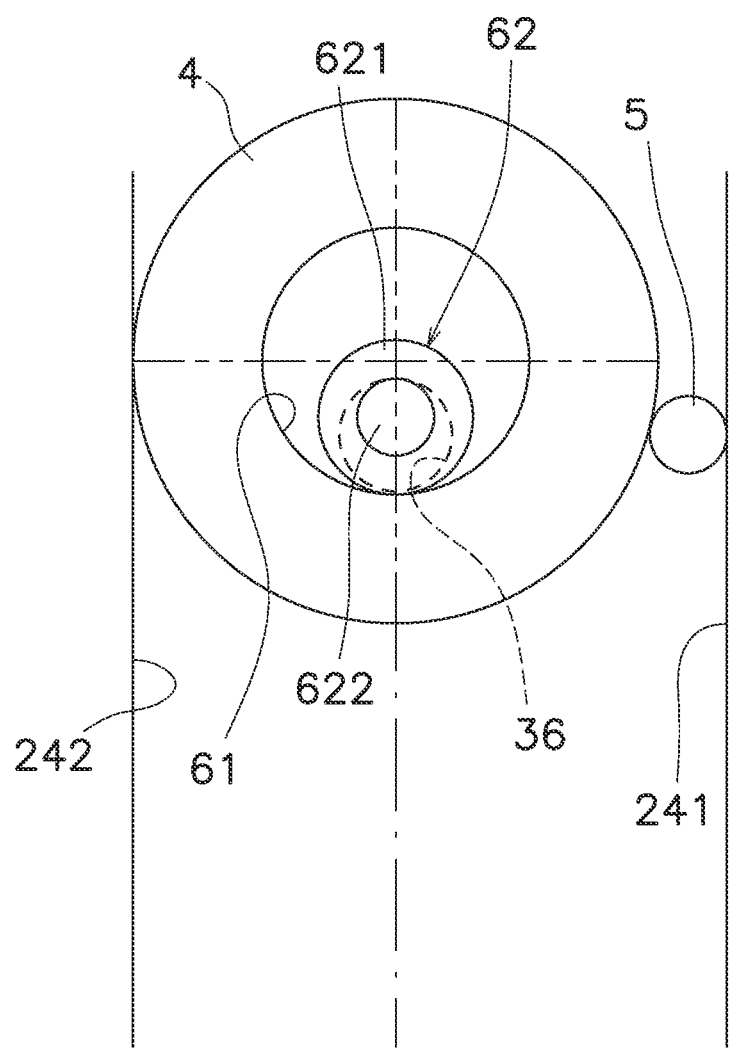
FIG. 16 is a diagram roughly showing a positional relation among a centrifugal element, a cam follower, an inertia ring, and a first rolling member in a condition without input of torque fluctuations.
Figure 17:
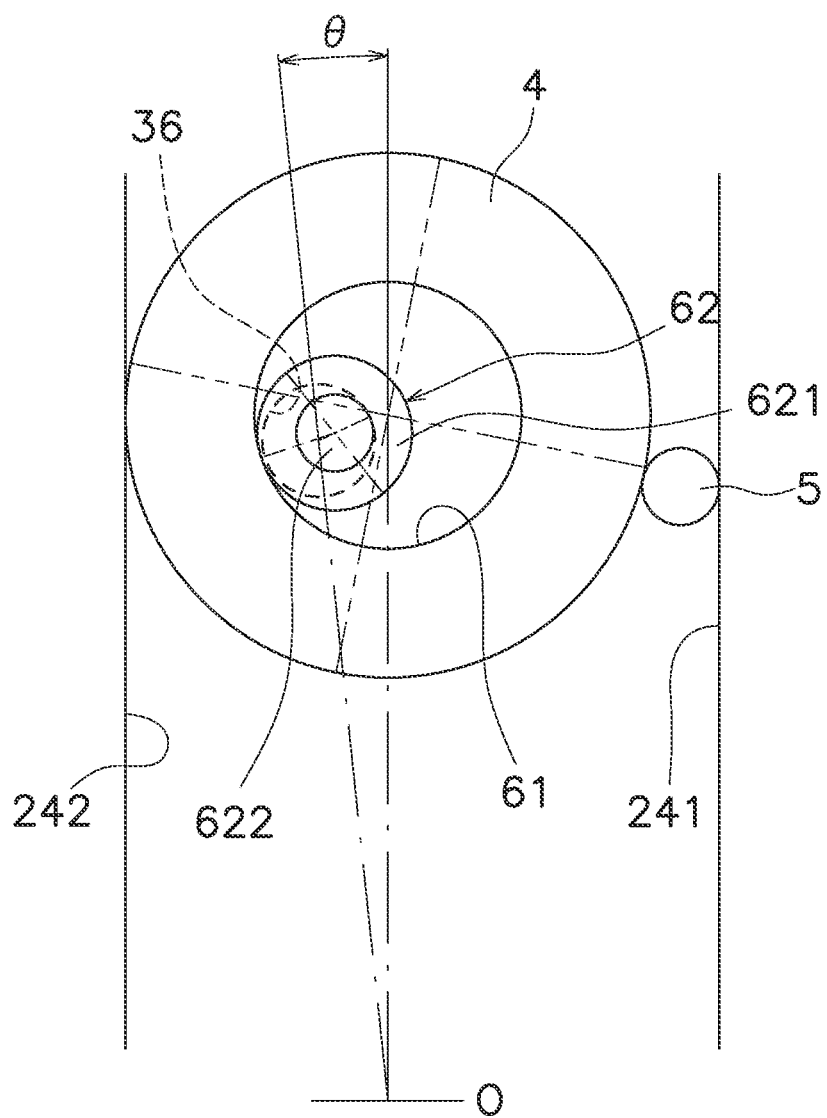
FIG. 17 is a diagram roughly showing a positional relation among the centrifugal element, the cam follower, the inertia ring, and the first rolling member in a condition with input of torque fluctuations.

When the cam follower 62 of each cam mechanism 6 is moved from a position shown in FIG. 16 to a position shown in FIG. 17, the centrifugal element 4 rotates clockwise about the rotational axis thereof, whereby the first rolling member 5 rotates counterclockwise about the rotational axis thereof. Then, the first rolling member 5 is moved radially inward, while rolling on the first guide surface 241.

Conversely, when the cam follower 62 is returned to the position shown in FIG. 16 from the position shown in FIG. 17, the centrifugal element 4 rotates counterclockwise about the rotational axis thereof, whereby the first rolling member 5 rotates clockwise about the rotational axis thereof. Then, the first rolling member 5 is moved radially outward, while rolling on the first guide surface 241.

Figure 18:
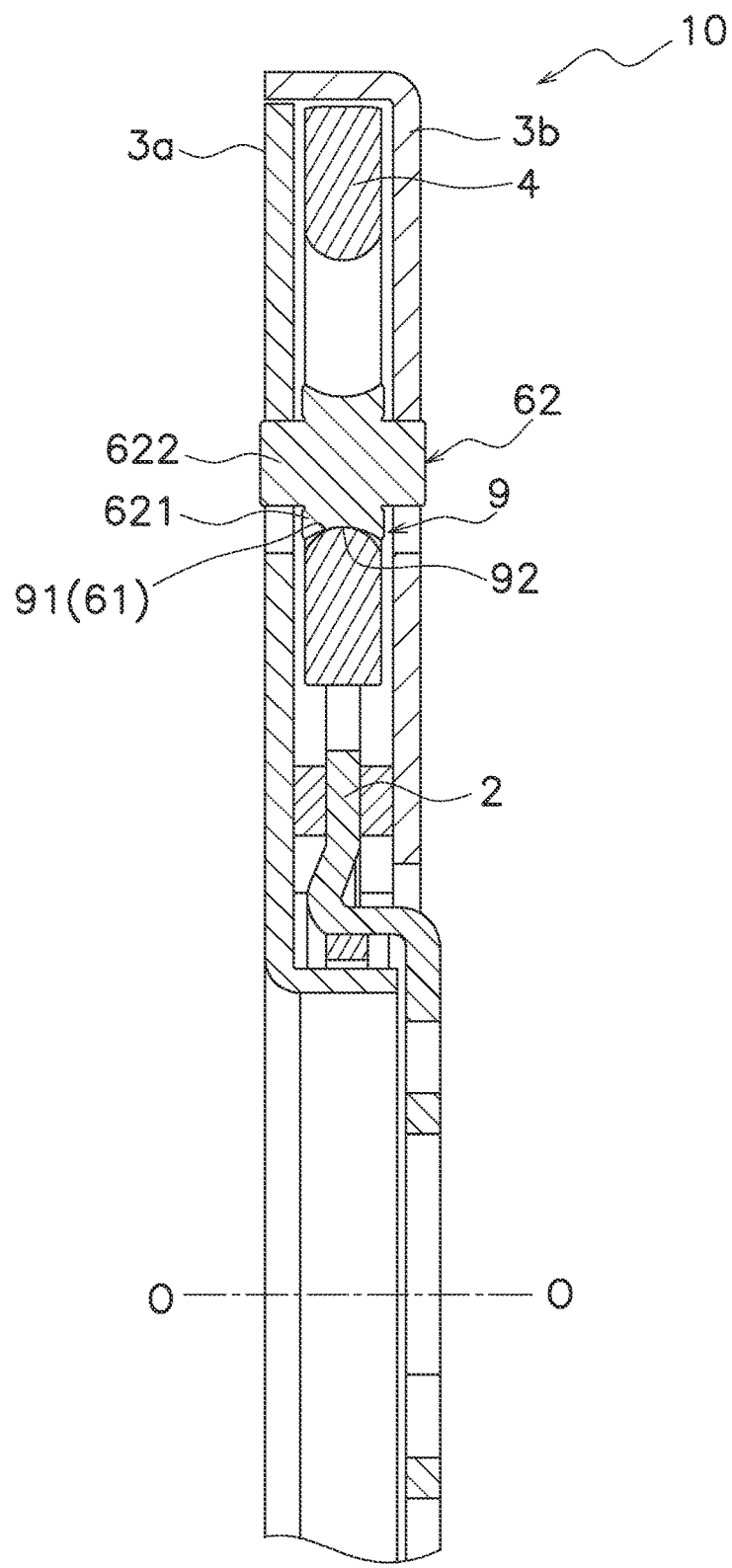
FIG. 18 is an enlarged cross-sectional view of a tilt preventing mechanism according to the second embodiment.

As shown in FIG. 18, in the present embodiment, each tilt preventing mechanism 9 includes a contact surface 91 and a guide surface 92 instead of the groove 901 and the protrusion 902. The contact surface 91 is provided on each centrifugal element 4. It should be noted that in the present embodiment, the cam surface 61 of each centrifugal element 4 is provided as the contact surface 91. The contact surface 91 faces radially outward.

The contact surface 91 protrudes radially outward. The contact surface 91 protrudes to gradually increase in height axially toward a middle part thereof. The contact surface 91 has a circular-arc cross section. The contact surface 91 bulges radially outward.

Each centrifugal element 4 is shaped to have the smallest inner diameter in a thickness directional middle thereof. The inner diameter of each centrifugal element 4 gradually reduces toward the thickness directional middle of each centrifugal element 4.

The guide surface 92 faces radially inward. The guide surface 92 is opposed to the contact surface 91. It should be noted that in actuation of the torque fluctuation inhibiting device 10, the guide surface 92 makes contact with the cam surface 61 of each centrifugal element 4. The guide surface 92 is provided on each cam follower 62. When described in detail, the guide surface 92 is provided on the outer peripheral surface of each cam follower 62. In more detail, the guide surface 92 is provided on the outer peripheral surface of the large diameter portion 621 of each cam follower 62.

The guide surface 92 dents radially outward. The guide surface 92 dents to gradually increase in depth axially toward a middle part thereof. The guide surface 92 has a circular-arc cross section. The guide surface 92 dents radially outward. The guide surface 92 is greater in curvature radius than the contact surface 91.

The large diameter portion 621 of each cam follower 62 is shaped to have the smallest outer diameter in a thickness directional middle thereof. The outer diameter of the large diameter portion 621 gradually reduces toward the thickness directional middle of the large diameter portion 621.

With the guide surface 92 formed as described above, each centrifugal element 4 is kept in posture, while making contact with the guide surface 92 through the contact surface 91. Because of this, tilting of each centrifugal element 4 can be prevented.

[Modifications]

The present invention is not limited to the respective embodiments described above, and a variety of changes or modifications can be made without departing from the scope of the present invention.

<Modification 1>

In the respective embodiments described above, the torque fluctuation inhibiting device has been exemplified as the rotary device. However, the rotary device can be any suitable device other than the torque fluctuation inhibiting device, for instance, a clutch device, a damper device, or so forth.

<Modification 2>

In the embodiments described above, the flange plate 2 has been exemplified as the first rotor. However, the first rotor is not limited to the above. For example, when a torque fluctuation inhibiting device is attached to a torque converter as configured in the respective embodiments, the front cover 11, the input-side rotor 131, or so forth can be set as the first rotor in the torque converter 100.

<Modification 3>

In the respective embodiments described above, the torque fluctuation inhibiting device 10 is attached to the torque converter 100. Alternatively, the torque fluctuation inhibiting device 10 can be attached to another type of power transmission device such as a clutch device.

Figure 19:
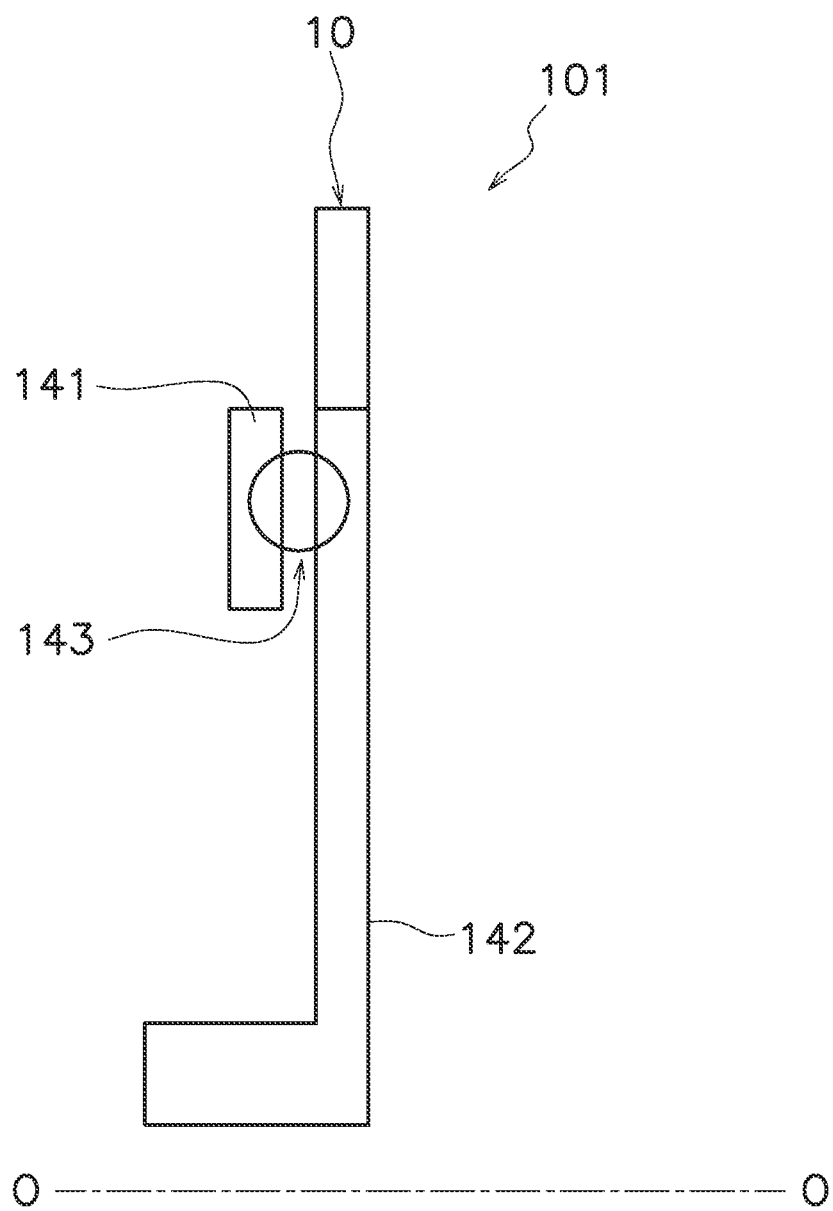
FIG. 19 is a schematic diagram of a damper device.

For example, as shown in FIG. 19, the torque fluctuation inhibiting device 10 can be attached to a damper device 101. The damper device 101 is installed in, for instance, a hybrid vehicle. The damper device 101 includes an input member 141, an output member 142, a damper 143, and the torque fluctuation inhibiting device 10. The input member 141 is a member to which a torque is inputted from a drive source. The damper 143 is disposed between the input member 141 and the output member 142. The output member 142 is a member to which the torque is transmitted from the input member 141 through the damper 143. The torque fluctuation inhibiting device 10 is attached to, for instance, the output member 142.

<Modification 4>

Figure 20:
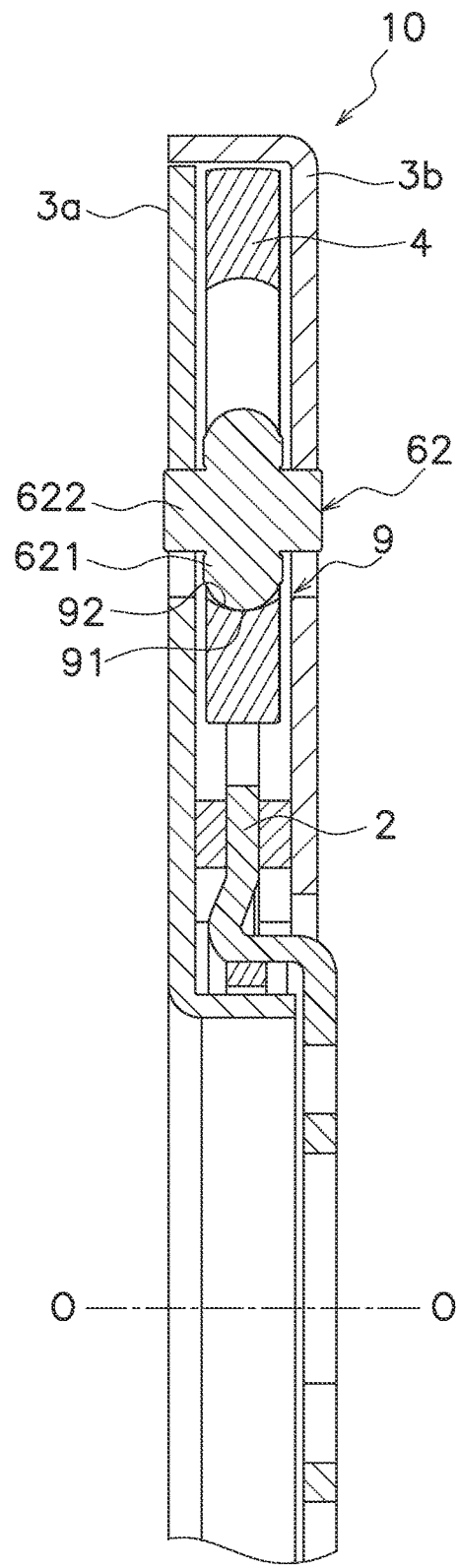
FIG. 20 is an enlarged cross-sectional view of a torque fluctuation inhibiting device according to a modification.

In the second embodiment described above, each centrifugal element 4 is provided with the contact surface 91, whereas each cam follower 62 is provided with the guide surface 92. However, the configuration of each tilt preventing mechanism 9 is not limited to this. For example, as shown in FIG. 20, each cam follower 62 is provided with the contact surface 91. In this case, the contact surface 91 faces radially inward. The contact surface 91 gradually increases in height axially toward a middle part thereof.

On the other hand, each centrifugal element 4 can be provided with the guide surface 92. The guide surface 92 faces radially outward. The guide surface 92 dents to gradually increase in depth axially toward a middle part thereof <Modification 5>

Figure 21:
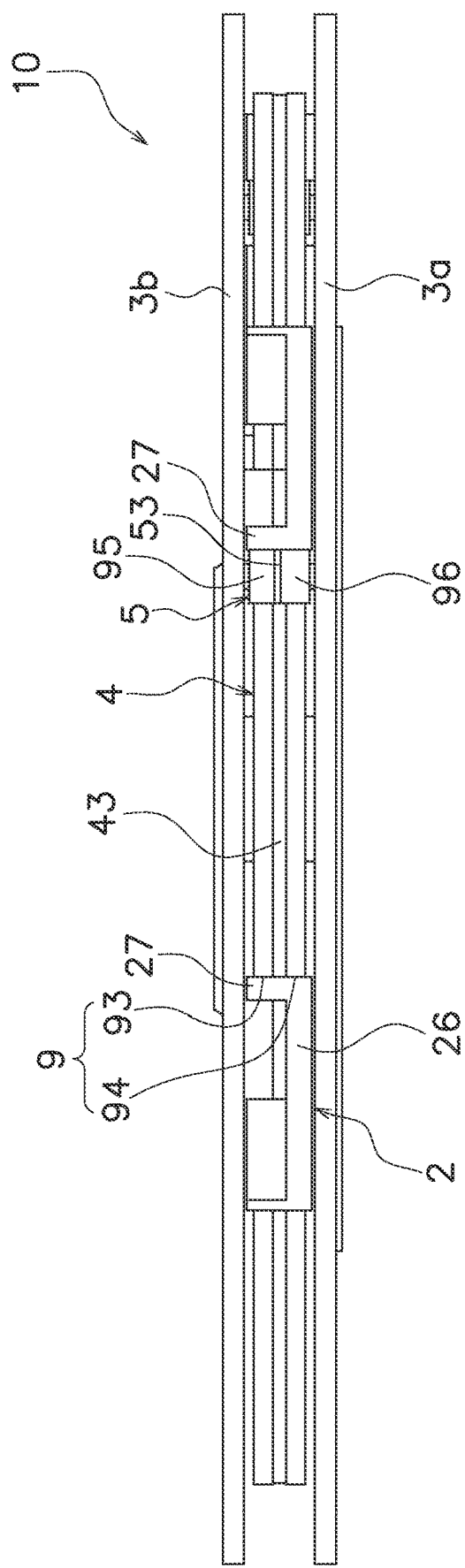
FIG. 21 is a top view a torque fluctuation inhibiting device according to another modification.

The configuration of each tilt preventing mechanism 9 is not limited to that in each of the embodiments described above. For example, as shown in FIG. 21, each tilt preventing mechanism 9 can be composed of a first contact surface 93 and a second contact surface 94, both of which are provided on each centrifugal element 4. It should be noted that the inertia blocks 38 and the rivets 35 are not shown in FIG. 21 for easy understanding of the drawing.

The first and second contact surfaces 93 and 94 are provided as part of the outer peripheral surface of each centrifugal element 4. The first and second contact surfaces 93 and 94 are disposed axially apart from each other at an interval. It should be noted that each centrifugal element 4 is provided with a groove 43 on the outer peripheral surface thereof. The groove 43 is provided on a thickness directional middle part of each centrifugal element 4. The groove 43 annularly extends along the outer peripheral surface of each centrifugal element 4. The first and second contact surfaces 93 and 94 are disposed such that the groove 43 is axially interposed therebetween.

The first and second contact surfaces 93 and 94 make contact with the flange plate 2. The flange plate 2 includes a body 26 and a plurality of contact portions 27. Each contact portion 27 has a plate shape and extends from the body 26 in both axial and radial directions. Either of each adjacent contact portions 27 is contacted by the first and second contact surfaces 93 and 94. It should be noted that each contact portion 27 is greater in axial dimension than each centrifugal element 4. The either of each adjacent contact portions 27 is provided with the second guide surface 242. In other words, the first and second contact surfaces 93 and 94 make contact with the second guide surface 242.

On the other hand, each first rolling member 5 includes a third contact surface 95 and a fourth contact surface 96. The third and fourth contact surfaces 95 and 96 are provided as part of the outer peripheral surface of each first rolling member 5. The third and fourth contact surfaces 95 and 96 are disposed axially apart from each other at an interval. It should be noted that each first rolling member 5 is provided with a groove 53 on the outer peripheral surface thereof. The groove 53 is provided on a thickness directional middle part of each first rolling member 5. The groove 53 annularly extends along the outer peripheral surface of each first rolling member 5. The third and fourth contact surfaces 95 and 96 are disposed such that the groove 53 is axially interposed therebetween.

The third and fourth contact surfaces 95 and 96 make contact with the other of each adjacent contact portions 27. It should be noted that the other of each adjacent contact portions 27, contacted by the third and fourth contact surfaces 95 and 96, is provided with the first guide surface 241. In other words, the third and fourth contact surfaces 95 and 96 make contact with the first guide surface 241.

Besides, the third and fourth contact surfaces 95 and 96 make contact with each centrifugal element 4 as well. When described in detail, the third contact surface 95 makes contact with the first contact surface 93. On the other hand, the fourth contact surface 96 makes contact with the second contact surface 94.

Figure 22:
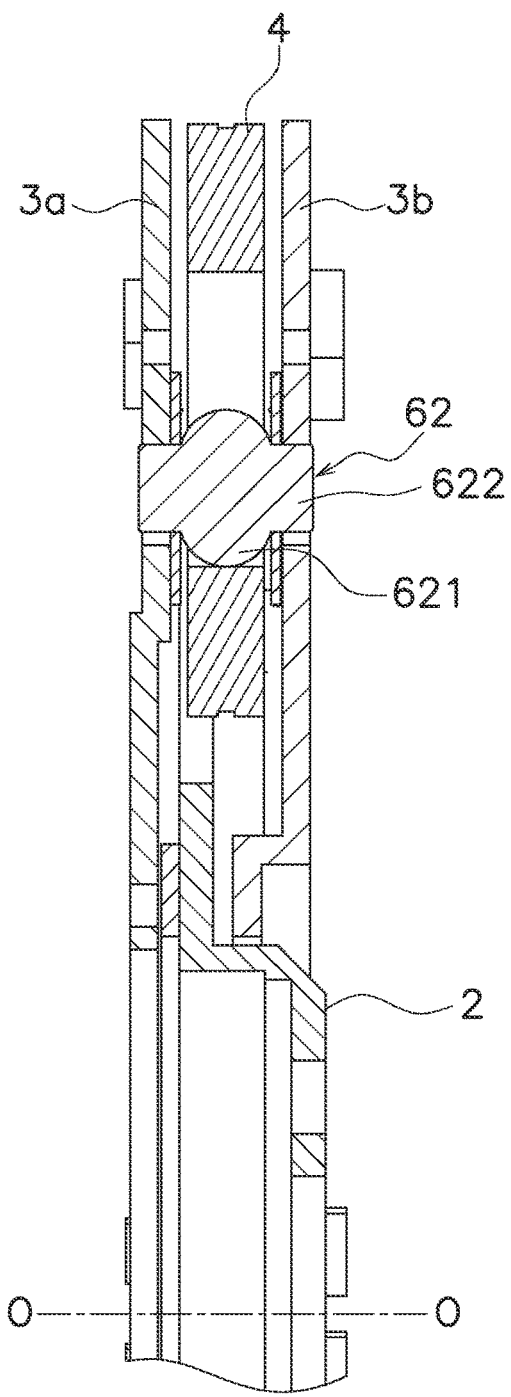
FIG. 22 is an enlarged cross-sectional view of the torque fluctuation inhibiting device according to the above-mentioned another modification.

As shown in FIG. 22, the large diameter portion 621 of each cam follower 62 can have an outer diameter that gradually increases toward a thickness directional middle thereof <Modification 6>

Figure 23:
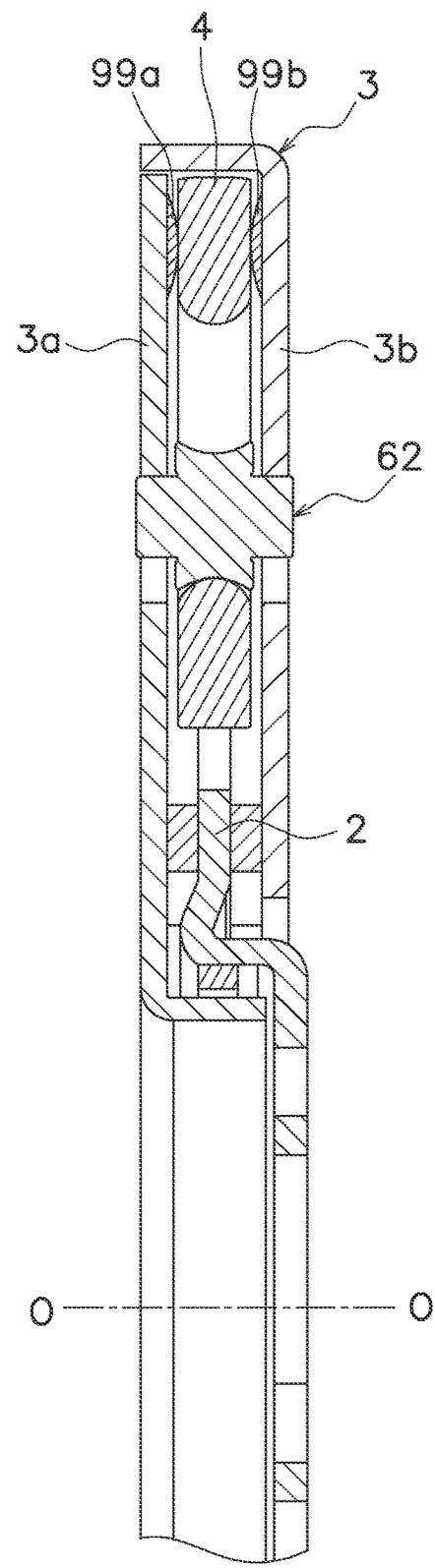
FIG. 23 is an enlarged cross-sectional view of a torque fluctuation inhibiting device according to yet another modification.

Each tilt preventing mechanism 9 can be composed of other constituent elements as well. For example, as shown in FIG. 23, each tilt preventing mechanism 9 can be composed of a first slide member 99a and a second slide member 99b. The first and second slide members 99a and 99b are disposed between the centrifugal elements 4 and the inertia ring 3. When described in detail, the first slide member 99a is disposed between the centrifugal elements 4 and the first plate 3a, whereas the second slide member 99b is disposed between the centrifugal elements 4 and the second plate 3b.

The first slide member 99a is fixed to the first plate 3a, whereas the second slide member 99b is fixed to the second plate 3b. The first and second slide members 99a and 99b are each made in shape of an annulus extending in the circumferential direction. The first and second slide members 99a and 99b curve to reduce in thickness toward both outer and inner peripheral edges thereof.

The first and second slide members 99a and 99b can be made of resin, more specifically, polytetrafluoroethylene (PTFE), polyether ether ketone (PEEK), thermoplastic polyimide (TPI), or so forth.

<Modification 7>

Figure 24:
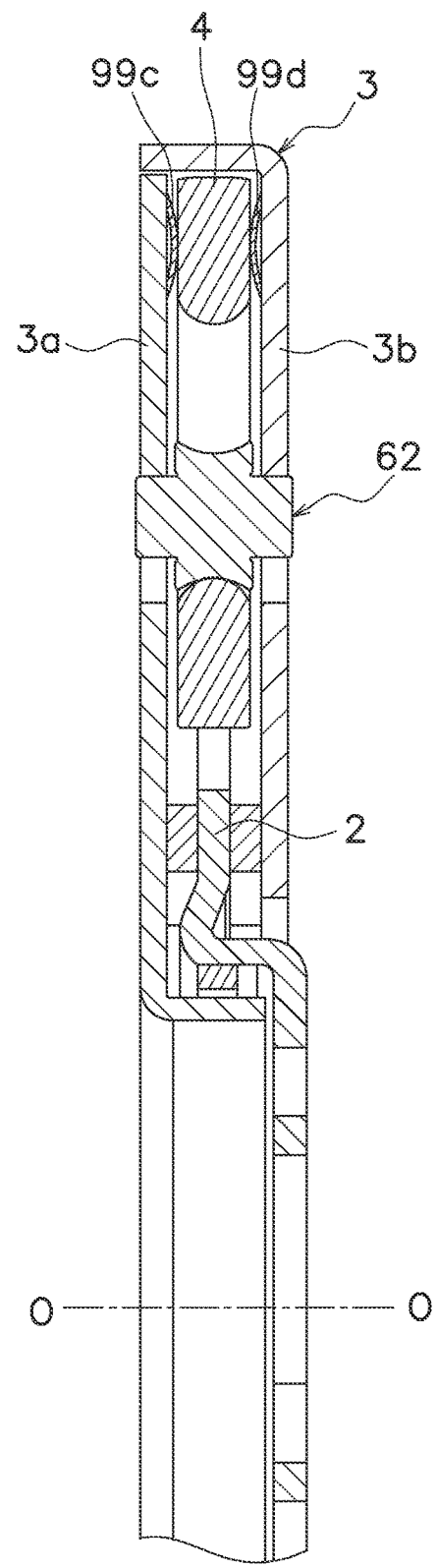
FIG. 24 is an enlarged cross-sectional view of a torque fluctuation inhibiting device according to further yet another modification.

As shown in FIG. 24, each tilt preventing mechanism 9 can be composed of a first elastic member 99c and a second elastic member 99d. The first and second elastic members 99c and 99d are disposed between the centrifugal elements 4 and the inertia ring 3. When described in detail, the first elastic member 99c is disposed between the centrifugal elements 4 and the first plate 3a, whereas the second elastic member 99d is disposed between the centrifugal elements 4 and the second plate 3b.

The first elastic member 99c is fixed to the first plate 3a, whereas the second elastic member 99d is fixed to the second plate 3b. The first and second elastic members 99c and 99d are each made in shape of an annulus extending in the circumferential direction. When at least one centrifugal element 4 tilts to approach either of the first and second elastic members 99c and 99d, this elastic member 99c, 99d is configured to urge the at least one centrifugal element 4, whereby the at least one centrifugal element 4 is restored to the original posture thereof. For example, wave springs or so forth can be employed as the first and second elastic members 99c and 99d.

REFERENCE SIGNS LIST

2: Flange plate
241: First guide surface
242: Second guide surface
3: Inertia ring
3a: First plate
3b: Second plate
36: Second through hole
4: Centrifugal element
41: First through hole
5: First rolling member
6: Cam mechanism
61: Cam surface
62: Cam follower
9: Tilt preventing mechanism
91: Contact surface
92: Guide surface
93: First contact surface
94: Second contact surface
99c: First elastic member
99d: Second elastic member
901: Groove
902: Protrusion
10: Torque fluctuation inhibiting device
15: Slide member
100: Torque converter
141: Input member
142: Output member

What is claimed is:

1. A rotary device, comprising:
a first rotor disposed to be rotatable;
a centrifugal element supported to be radially movable with respect to the first rotor;
a tilt preventing mechanism configured to prevent the centrifugal element from tilting; and
a support member configured to support the centrifugal element from radially outside when the centrifugal element is moved radially outward, the tilt preventing mechanism being further configured to restrict the centrifugal element from axially moving with respect to the support member,
wherein the tilt preventing mechanism includes a groove and a protrusion, the groove provided on either of the support member and the centrifugal element, the protrusion provided on another of the support member and the centrifugal element, the protrusion disposed within the groove.

2. The rotary device according to claim 1, further comprising:
a second rotor disposed to be rotatable with the first rotor and be rotatable relative to the first rotor.

3. The rotary device according to claim 2, further comprising:
a cam mechanism configured to receive a centrifugal force acting on the centrifugal element, the cam mechanism further configured to convert the centrifugal force into a circumferential force directed to reduce rotational phase difference between the first rotor and the second rotor.

4. The rotary device according to claim 3, wherein the cam mechanism includes
a cam surface provided on the centrifugal element, and
a cam follower configured to contact the cam surface, the cam follower further configured to transmit a force therethrough between the centrifugal element and the second rotor.

5. The rotary device according to claim 4, wherein the cam follower rolls on the cam surface.

6. The rotary device according to claim 4, wherein
the centrifugal element includes a first through hole axially penetrating therethrough, and
the cam surface is provided as part of an inner wall surface of the first through hole.

7. The rotary device according to claim 4, wherein the cam follower is attached to the second rotor in a state of being rotatable about a rotational axis thereof.

8. The rotary device according to claim 4, wherein
the second rotor includes a second through hole, and
the cam follower rolls on an inner wall surface of the second through hole.

9. The rotary device according to claim 8, wherein
the cam follower includes a small diameter portion and a large diameter portion, the small diameter portion configured to contact the inner wall surface of the second through hole, the large diameter portion configured to contact the centrifugal element, and
the large diameter portion has an outer diameter gradually increasing toward a thickness directional middle thereof.

10. The rotary device according to claim 1, further comprising:
a second rotor disposed to be rotatable with the first rotor and be rotatable relative to the first rotor, wherein
the tilt preventing mechanism includes a slide member disposed between the centrifugal element and the second rotor.

11. The rotary device according to claim 10, wherein the slide member has an annulus shape which circumferentially extends.

12. The rotary device according to claim 10, wherein the slide member curves to reduce in thickness toward both outer and inner peripheral edges thereof.

13. The rotary device according to claim 1, further comprising:
a second rotor disposed to be rotatable with the first rotor and be rotatable relative to the first rotor, wherein
the tilt preventing mechanism includes an elastic member disposed between the centrifugal element and the second rotor.

14. The rotary device according to claim 13, wherein
the second rotor includes a first plate and a second plate, the first and second plates disposed axially apart from each other,
the centrifugal element is disposed between the first and second plates, and
the elastic member includes a first elastic member and a second elastic member, the first elastic member disposed between the first plate and the centrifugal element, the second elastic member disposed between the second plate and the centrifugal element.

15. The rotary device according to claim 1, wherein the centrifugal element is configured to rotate about a rotational axis thereof in radial movement thereof.

16. The rotary device according to claim 15, further comprising:
a first rolling member, wherein
the first rotor includes a first guide surface and a second guide surface, the first and second guide surfaces circumferentially facing each other, and
the first rolling member is disposed between the first guide surface and the centrifugal element, the first rolling member configured to roll on the first guide surface in accordance with rotation of the centrifugal element about the rotational axis thereof.

17. The rotary device according to claim 16, wherein the centrifugal element is further configured to roll on the second guide surface.

18. A power transmission device comprising:
an input member;
an output member to which a torque is transmitted from the input member; and
the rotary device according to claim 1.

* * * * *